(12) United States Patent
Bosma et al.

(10) Patent No.: US 12,065,225 B2
(45) Date of Patent: Aug. 20, 2024

(54) RAPID AERIAL EXTRACTION SYSTEMS

(71) Applicant: Modern Technology Solutions, Inc., Alexandria, VA (US)

(72) Inventors: Marinus Bernard Bosma, Tipp City, OH (US); Charles David Solomon, Huber Heights, OH (US); Peter Forrest LeHew, Catlett, VA (US)

(73) Assignee: Modern Technology Solutions, Inc., Alexandria, VA (US)

( * ) Notice: Subject to any disclaimer, the term of this patent is extended or adjusted under 35 U.S.C. 154(b) by 432 days.

(21) Appl. No.: 17/217,973

(22) Filed: Mar. 30, 2021

(65) Prior Publication Data

US 2021/0237839 A1 Aug. 5, 2021

Related U.S. Application Data

(63) Continuation-in-part of application No. 16/613,403, filed as application No. PCT/US2019/030273 on May 1, 2019, now Pat. No. 10,960,976.

(60) Provisional application No. 62/665,905, filed on May 2, 2018.

(51) Int. Cl.
*B63C 9/01* (2006.01)
*B64D 1/22* (2006.01)

(52) U.S. Cl.
CPC . *B63C 9/01* (2013.01); *B64D 1/22* (2013.01)

(58) Field of Classification Search
CPC .... B63C 9/01; B64D 1/22; B64D 5/00; B64D 17/00; B64D 1/08; B64U 10/13; B64U 2101/60; B64U 2201/20; B64C 39/022; B64C 39/024; G01C 21/20; G05D 1/101; H04B 1/0064

See application file for complete search history.

(56) References Cited

U.S. PATENT DOCUMENTS

| | | | | | |
|---|---|---|---|---|---|
| 1,829,474 | A | * | 10/1931 | Chilowsky | B64D 1/22 244/137.1 |
| 2,298,912 | A | * | 10/1942 | Alabrune | B64D 1/22 244/1 R |
| 2,973,923 | A | * | 3/1961 | Sznycer | B64D 1/22 244/17.11 |
| 3,351,325 | A | * | 11/1967 | Cotton | B64D 1/00 244/137.1 |
| 3,373,994 | A | * | 3/1968 | Woodward | F41J 9/10 244/3 |

(Continued)

*Primary Examiner* — Medhat Badawi

(74) *Attorney, Agent, or Firm* — Cynthia S. Lamon; Lamon Patent Services

(57) ABSTRACT

A method for extracting a rescue subject from a surface position includes lowering a rescue pod having an enclosed compartment with a door from an aircraft, the rescue pod having a parachute and a control system, the rescue pod connected by a tether to a winch in the aircraft, controllably releasing the tether from the winch while maneuvering the aircraft into an orbit at altitude, diameter and airspeed, creating a gravity well in which the tether describes a spiral configuration with the pod descending along a vertical centerline, lowering the pod to the surface position, loading the rescue subject into the enclosed compartment, and lifting the rescue pod from the surface position by retrieving the tether with the winch or altering the path and speed of the aircraft, in a manner to gradually increase tension in the tether lifting the rescue pod from the ground point.

20 Claims, 37 Drawing Sheets

(56) References Cited

U.S. PATENT DOCUMENTS

| | | | | |
|---|---|---|---|---|
| 3,833,189 A * | 9/1974 | Fowler | B64C 27/57 | 244/177 |
| 3,946,971 A * | 3/1976 | Chadwick | B64D 1/08 | 244/137.4 |
| 4,342,437 A * | 8/1982 | Farinacci | B64D 1/08 | 244/149 |
| 4,416,436 A * | 11/1983 | Wilson, Jr. | B64D 1/22 | 244/137.1 |
| 4,884,769 A * | 12/1989 | Snead | B64D 1/22 | 244/145 |
| 5,088,663 A * | 2/1992 | Henson | B64G 1/005 | 244/137.4 |
| 5,593,113 A * | 1/1997 | Cox | B66C 1/34 | 294/82.26 |
| 5,722,618 A * | 3/1998 | Jacobs | G05D 1/101 | 244/137.1 |
| 6,086,015 A * | 7/2000 | MacCready, Jr. | B64C 39/024 | 244/45 R |
| 6,389,194 B1 * | 5/2002 | Passman | G02B 6/3604 | 385/100 |
| 6,427,944 B1 * | 8/2002 | Passman | B64D 47/02 | 244/1 R |
| 6,705,571 B2 * | 3/2004 | Shay | B64D 1/08 | 244/137.4 |
| 7,887,011 B1 * | 2/2011 | Baldwin | B64D 1/22 | 294/68.1 |
| 8,366,049 B2 * | 2/2013 | Karem | B64D 1/08 | 244/137.1 |
| 8,591,161 B1 * | 11/2013 | Bernhardt | G05D 1/0858 | 414/137.1 |
| 8,800,930 B1 * | 8/2014 | Bourakov | B64C 25/68 | 244/152 |
| 8,870,123 B2 * | 10/2014 | Deazley | B64D 17/62 | 244/149 |
| 9,061,764 B2 * | 6/2015 | Riley | B64D 17/34 | |
| 9,315,273 B2 * | 4/2016 | McCann | B64D 17/025 | |
| 9,422,139 B1 * | 8/2016 | Bialkowski | B64D 1/22 | |
| 9,676,481 B1 * | 6/2017 | Buchmueller | B64D 1/02 | |
| 9,958,876 B2 * | 5/2018 | Vander Lind | G01S 19/14 | |
| 10,023,312 B2 * | 7/2018 | Repp | B66D 1/60 | |
| 10,071,804 B1 * | 9/2018 | Buchmueller | B64C 39/024 | |
| 10,519,013 B2 * | 12/2019 | Curran | B64D 1/08 | |
| 10,960,976 B2 * | 3/2021 | Bosma | B64C 29/00 | |
| 11,209,836 B1 * | 12/2021 | Sikora | G06V 20/17 | |
| 11,667,394 B2 * | 6/2023 | Bosma | B64D 39/02 | 244/195 |
| 2004/0032140 A1 * | 2/2004 | Solstad | B66C 13/08 | 294/81.4 |
| 2007/0200032 A1 * | 8/2007 | Eadie | B64D 1/22 | 244/137.4 |
| 2011/0121138 A1 * | 5/2011 | Walsh | B64D 17/74 | 244/149 |
| 2013/0033381 A1 * | 2/2013 | Breed | G08B 13/2417 | 340/568.1 |
| 2017/0328814 A1 * | 11/2017 | Castendyk | G01N 1/12 | |
| 2019/0086920 A1 * | 3/2019 | Miller | H04N 7/181 | |
| 2019/0241267 A1 * | 8/2019 | Sikora | B64D 1/08 | |
| 2020/0189695 A1 * | 6/2020 | Nordstrom | B63B 22/18 | |
| 2020/0207471 A1 * | 7/2020 | Yasuda | B64D 1/22 | |
| 2021/0047032 A1 * | 2/2021 | Bosma | B64D 17/64 | |
| 2021/0163151 A1 * | 6/2021 | Bosma | B64D 5/00 | |
| 2021/0237839 A1 * | 8/2021 | Bosma | B64D 1/08 | |
| 2023/0192295 A1 * | 6/2023 | Blake | B64D 1/12 | 244/137.1 |
| 2023/0192296 A1 * | 6/2023 | Prager | B64D 1/22 | 258/1.2 |
| 2023/0211882 A1 * | 7/2023 | Franchi | B64C 27/04 | 244/118.1 |

\* cited by examiner

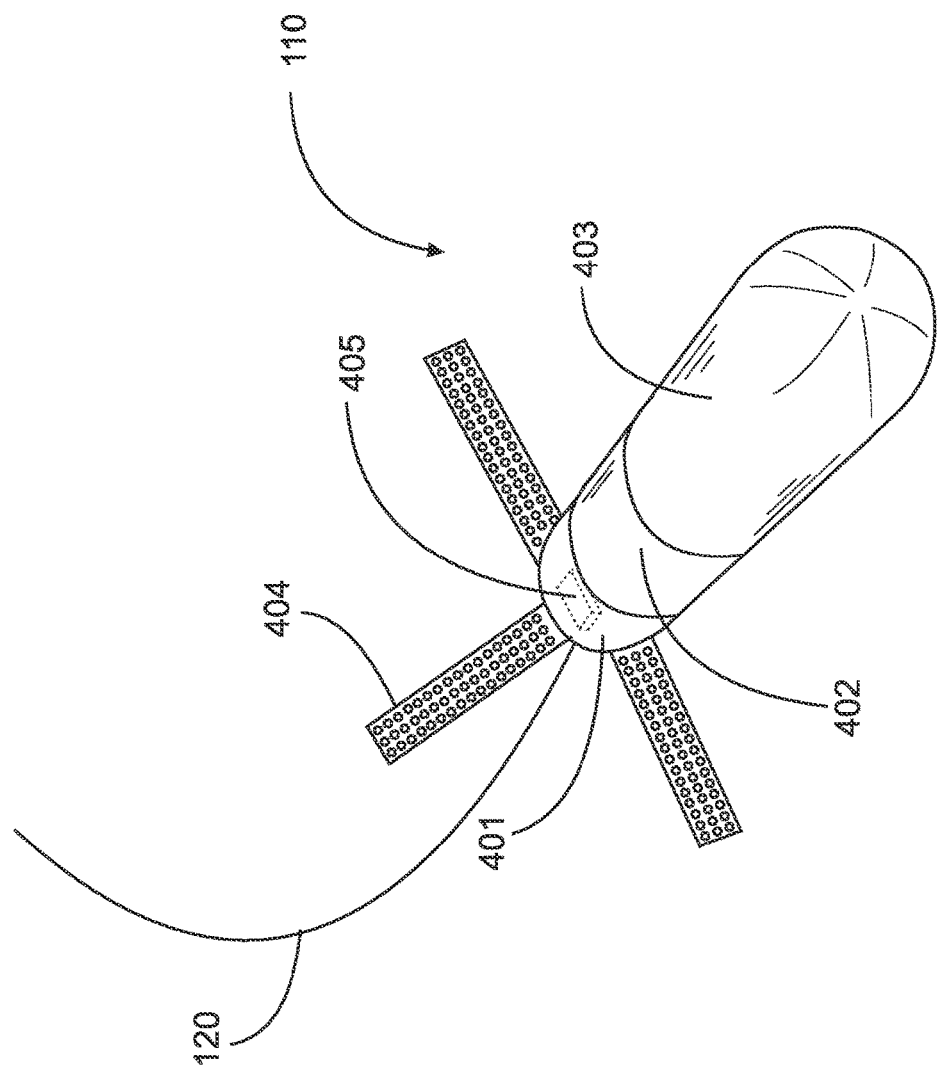

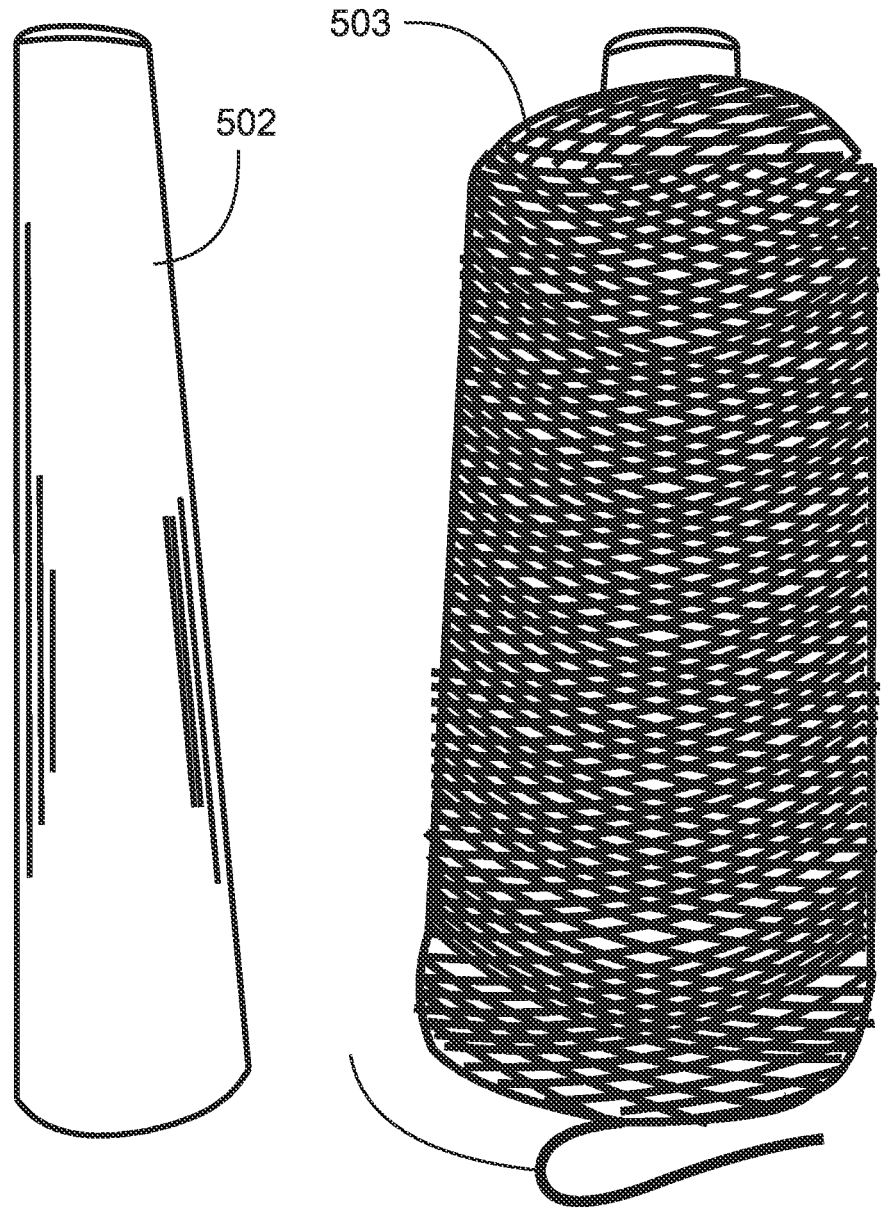
*Fig. 5A*      *Fig. 5B*

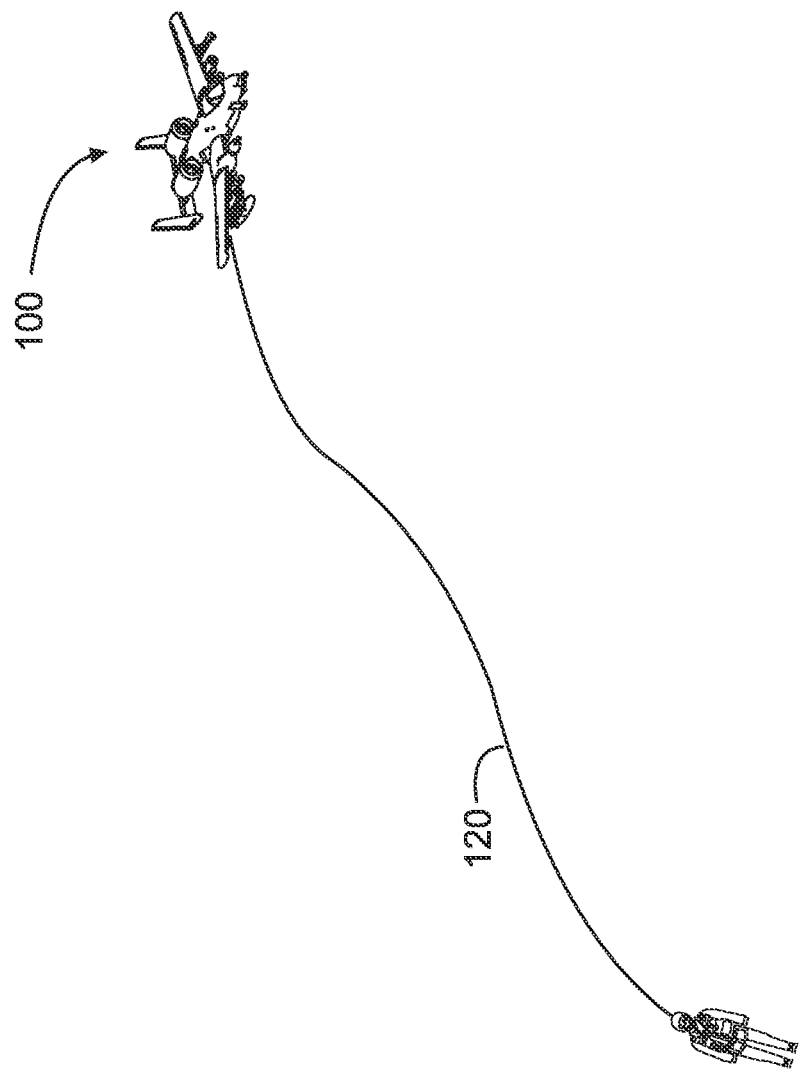

RAPID AERIAL EXTRACTION SYSTEMS

CROSS-REFERENCE TO RELATED APPLICATIONS

The present application claims priority to U.S. application Ser. No. 16/613,403, filed Nov. 13, 2019, which entered the National Phase in the U.S. from PCT/US19/30273, filed May 1, 2019, which claims priority to provisional patent application 62/665,905, filed on May 2, 2018. All disclosure of the parent applications are incorporated herein at least by reference

BACKGROUND OF THE INVENTION

1. Field of the Invention

The present invention is in the technical area of retrieving personnel and objects from ground by fixed-wing aircraft.

2. Description of Related Art

A need for apparatus and methods to find and retrieve individuals from hostile environments is well-known, such as, for example, in the circumstance of pilots and crew surviving crashes and forced landings in enemy territory, or who may have parachuted behind enemy lines from a damaged aircraft. Another such circumstance is retrieving persons who may have been injured, or are marooned or lost. In the conventional art vertical takeoff and landing (VTOL) vehicles may be used, such as helicopters and the like, but in some circumstances, there may be no convenient access for a VTOL vehicle, or access by a VTOL may be impractical for other reasons.

What is needed is apparatus and procedures for providing an individual at need with necessary equipment connected to a fixed-wing aircraft, whether small, unmanned aircraft/drone or larger manned cargo aircraft, at altitude, and procedures for delivering the equipment, and then extracting the individual and/or equipment by fixed-wing aircraft.

BRIEF SUMMARY OF THE INVENTION

In one embodiment of the invention a method for extracting a rescue subject from a surface position is provided, comprising lowering a rescue pod having an enclosed compartment with a door from an aircraft. The rescue pod may have a main parachute and a control system with wireless communication circuitry. In this embodiment, the rescue pod may be connected by a tether to apparatus with a winch in the aircraft, controllably releasing the tether from the winch in the aircraft while maneuvering the aircraft into a circular orbit at a specific altitude, diameter of orbit and airspeed, creating a gravity well in which the tether describes a descending spiral configuration with the pod descending along a vertical centerline of the circular orbit. The pod is then lowered to the surface position, wherein the rescue subject may be loaded into the enclosed compartment, and lifting the rescue pod from the surface position by retrieving the tether with the winch, altering the path and speed of the aircraft, or both, in a manner to gradually increase tension in the tether lifting the rescue pod from the ground point.

In one embodiment the method further comprises bringing the rescue pod back to and into the aircraft and unloading the rescue subject into the aircraft. Also in one embodiment the method further comprises carrying the rescue pod to a point over a predetermined second surface position, reestablishing the gravity well, lowering the rescue pod to the second surface position, and unloading the rescue subject. In one embodiment the method further comprises carrying the rescue pod to a point over a predetermined second surface position, releasing the pod from the tether, deploying the main parachute to deliver the rescue pod down to a point proximate the second surface position, and unloading the rescue subject. And in one embodiment the surface position is water and the rescue pod comprises inflatable flotation apparatus, comprising delivering the pod to the surface position, inflating the flotation apparatus causing the rescue pod to float with the door facing upward, and loading the rescue subject from the water into the enclosed compartment through the door.

In one embodiment the enclosed compartment is of a sufficient width to accommodate a second person in addition to the rescue subject, further comprising lowering the pod to the surface position with a medically trained rescue person in the compartment from the aircraft, loading the rescue subject, and treating the rescue subject by the medically trained person. In one embodiment the aircraft is an unmanned arial vehicle (UAV) and the control system is adapted for controlling the UAV, further comprising piloting the UAV by the second person or the rescue subject through the control system. In one embodiment the rescue pod has deployable countermeasures comprising one or more of chaff, flares and blinking lights controlled through the control system, further comprising deploying one or more countermeasures as needed. In one embodiment the rescue pod has a first floor in the compartment held by shear pins and a second floor below the first floor, the first and second floors separated by a crushable material, such that upon a hard landing the pins shear and deceleration is moderated by the first floor crushing the crushable material. And in one embodiment the rescue pod has an inflatable balloon below a bottom surface, further comprising inflating the balloon upon a hard landing, compression of the balloon moderating deceleration.

In another aspect of the invention a system for extracting a rescue subject from a surface position is provided, comprising a rescue pod having an enclosed compartment with a door, the rescue pod having a main parachute and a control system with wireless communication circuitry, an aircraft having a cargo bay with a door, and apparatus in the cargo bay of the aircraft comprising a winch adapted to deploy and retrieve a tether attached to the rescue pod. The rescue pod is launched through the door of the aircraft, the tether is controllably released by the winch, and the aircraft is maneuvered into a circular orbit at a specific altitude, diameter and airspeed, creating a gravity well in which the tether describes a descending spiral configuration with the pod descending along a vertical centerline of the circular orbit, the pod is lowered to the surface position, the rescue subject is loaded into the enclosed compartment, and the rescue pod is lifted from the surface position by retrieving the tether with the winch or altering the path and speed of the aircraft, or both, in a manner to gradually increase tension in the tether lifting the rescue pod from the ground point.

In one embodiment of the method the rescue pod is retrieved back to and into the aircraft and the rescue subject is unloaded into the aircraft. Also, in one embodiment the rescue pod is carried to a point over a predetermined second surface position, the gravity well is reestablished, the rescue pod is lowered to the second surface position, and the rescue subject is unloaded. In one embodiment the rescue pod is carried to a point over a predetermined second surface position, the pod is released from the tether, the main parachute is deployed, the rescue pod is delivered down to a point proximate the second surface position, and the rescue subject is unloaded. And in one embodiment the surface position is water and the rescue pod comprises inflatable flotation apparatus, wherein the pod is delivered to the surface position, the flotation apparatus is inflated causing the rescue pod to float with the door facing upward, and the rescue subject is loaded from the water into the enclosed compartment through the door.

In one embodiment of the method the enclosed compartment is of a sufficient width to accommodate a second person in addition to the rescue subject, wherein the pod is lowered to the surface position with a medically trained rescue person in the compartment from the aircraft, the rescue subject is loaded, and rescue subject is treated by the medically trained person. Also, in one embodiment the aircraft is an unmanned arial vehicle (UAV) and the control system is adapted for controlling the UAV, wherein the UAV is piloted by the second person or the rescue subject through the control system. In one embodiment the rescue pod has deployable countermeasures comprising one or more of chaff, flares and blinking lights controlled through the control system, wherein one or more countermeasures are deployed as needed. In one embodiment the rescue pod has a first floor in the compartment held by shear pins and a second floor below the first floor, the first and second floors separated by a crushable material, wherein upon a hard landing the pins shear and deceleration is moderated by the first floor crushing the crushable material. And in one embodiment the rescue pod has an inflatable balloon below a bottom surface, wherein the balloon is inflated upon a hard landing, compression of the balloon moderating deceleration.

BRIEF DESCRIPTION OF THE SEVERAL VIEWS OF THE DRAWINGS

FIG. 4 is an expanded view of a pod in descent from a fixed wing aircraft in an embodiment of the invention.

FIG. 5A illustrates a core upon which a bobbin is wound in an embodiment of the invention.

FIG. 5B illustrates a bobbin of tether line wound in the core of FIG. 5A.

FIG. 11 illustrates the individual of FIG. 10 further transported away from the ground point.

DETAILED DESCRIPTION OF THE INVENTION

In various embodiments of the present invention a system is provided for extraction of personnel or objects from a fixed point on the surface of the Earth by a fixed-wing aircraft. the fixed-wing aircraft being any one of a small, unmanned aircraft, for example a drone up to a larger manned cargo aircraft. The unique process employs precise deployment of an equipment and human carrying pod from the aircraft to a predetermined point on the surface. The pod may be tethered to the aircraft at all times, establishing a circular orbit by the aircraft at an altitude over the point on the surface, with the tether to the pod forming a spiral in a gravity well beneath the aircraft. An individual at the point on the surface (land or sea) opens the pod, dons an escape harness coupled to the tether, or enters the pod, including a parachute, and signals the aircraft when ready. The aircraft leaves the orbit, and performs in some cases altitude adjustment, which slowly withdraws slack in the tether, gradually lifting the escape harness or pod with the individual from the surface and away to a safe area where the individual may parachute to safety or be returned to the ground using the same flight orbit procedure.

Figure 1:
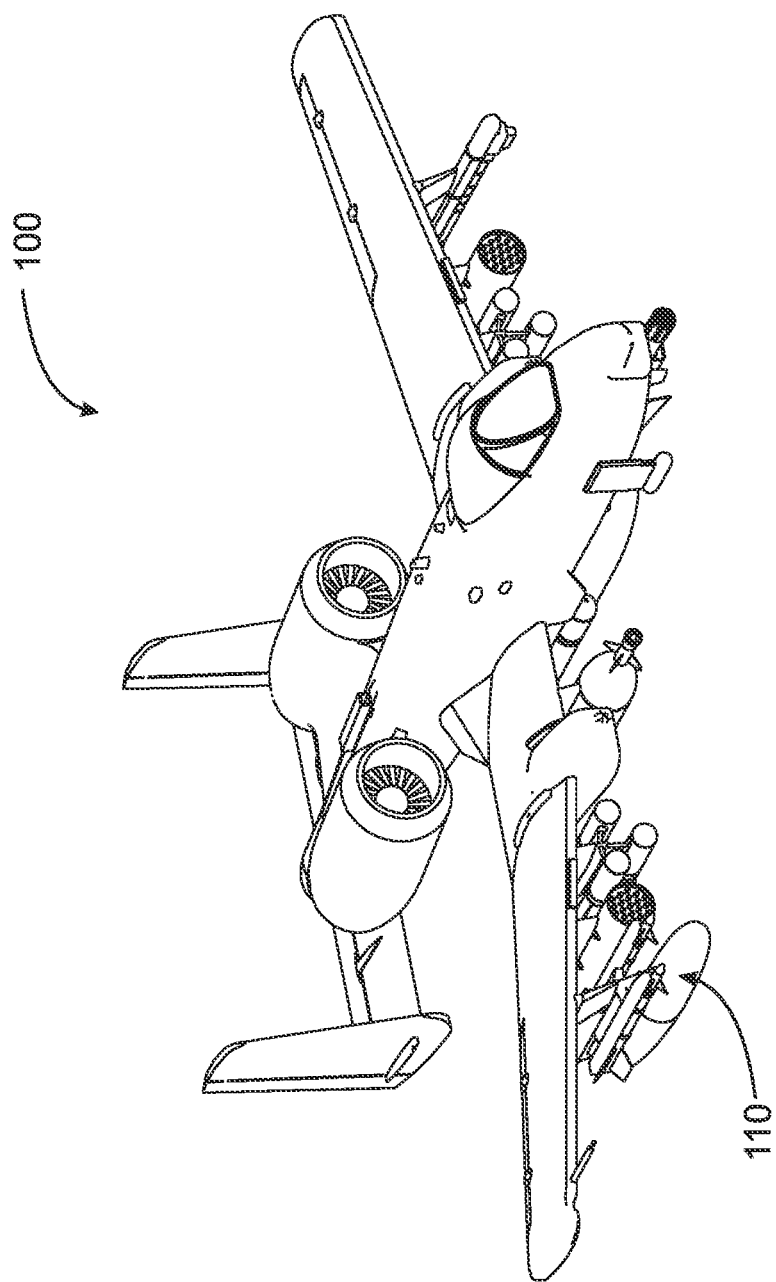
FIG. 1 is a perspective view of a fixed-wing aircraft suitable for employment in embodiments of the present invention.

FIG. 1 is a perspective view of a fixed-wing aircraft 100 suitable for employment in embodiments of the present invention, the aircraft carrying a pod 110 under a wing. In this example the aircraft is an A-10 Warthog, often termed a Hog. Many other aircraft may be similarly employed, and the invention is not limited to the A-10 aircraft. Although not apparent in FIG. 1 the pod carries a bobbin with a substantial length of line, the bobbin positioned at an end of the pod that will face the aircraft in deployment, an the tether is fixedly attached to the aircraft, usually at the point the pod is carried.

Figure 2:
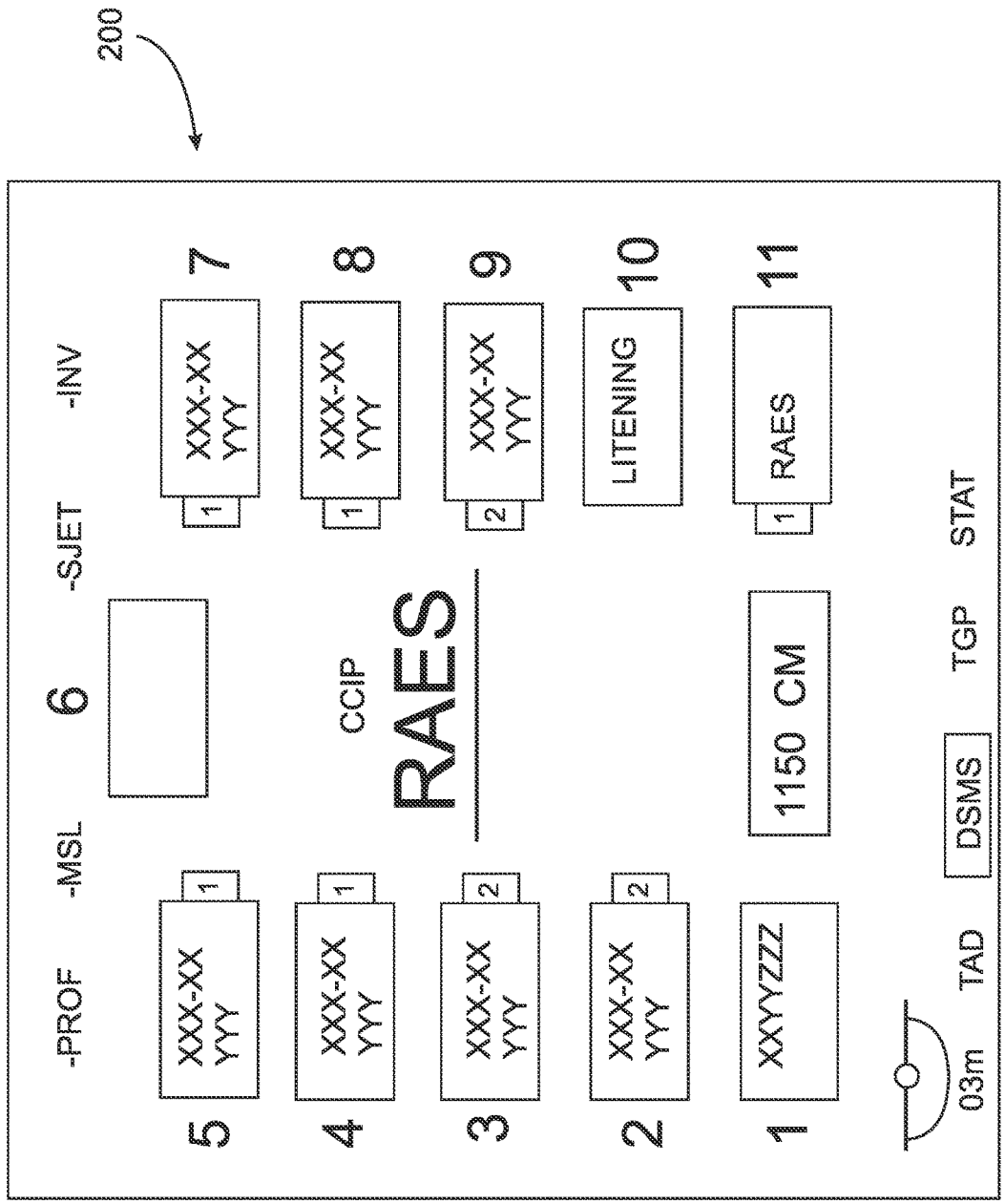
FIG. 2 is an exemplary view of a touch-screen control pad useful in control of procedures in embodiments of the present invention.

FIG. 2 is an exemplary illustration of a touchscreen interactive interface 200 that is used in a cockpit of aircraft 100 to enable a pilot to control deployment of pod 110 and navigation of aircraft 100 to deploy the pod to a predetermined position on ground surface, and to maintain the pod position until an individual has interacted with the pod, and is ready for extraction. The interactive interface comprises readouts for exhibiting characteristics of the pod and aircraft positions during an operation, and command inputs for various functions, such as pod deployment.

Figure 3:
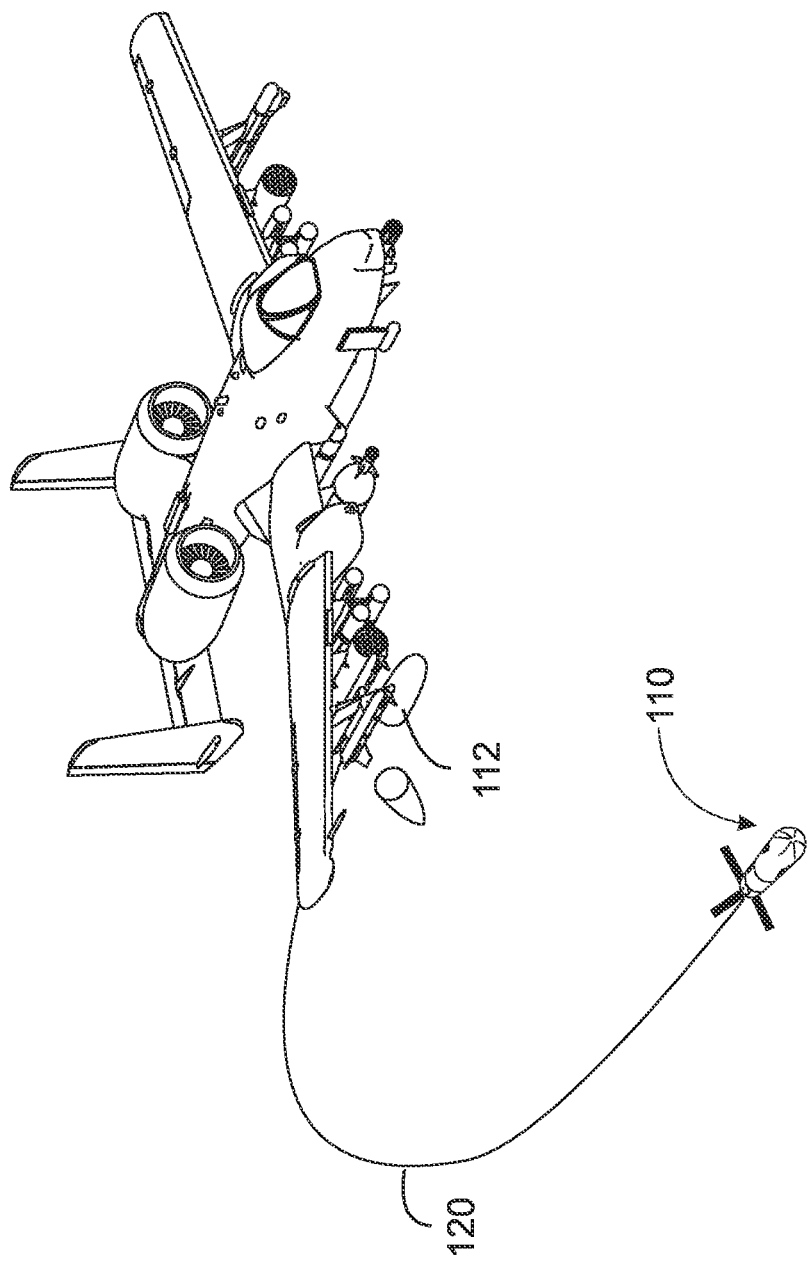
FIG. 3 is a perspective view of a fixed-wing aircraft deploying an equipment carrying pod in an embodiment of the present invention.

FIG. 3 is a perspective view of an aircraft 100 deploying equipment-carrying pod 110 in an embodiment of the present invention. Pod 110 in this example is carried in a capsule 112 prior to deployment, and at time of deployment a rear-section of capsule 112 is jettisoned, and pod 110 is pulled from the capsule by a drag chute, not shown, which is jettisoned after deployment. In FIG. 3 pod 110 is in free all, but is still connected to aircraft 100 by tether 120, which unwinds from a bobbin in the pod, as is described in additional detail below.

FIG. 4 is an expanded view pod 110 in descent from aircraft 100 in an embodiment of the invention. Pod 110 is seen to have elements 404, termed grid fins that stabilize the pod in flight, much as many bombs may be stabilized. Elements 404 may also be movable and may be used to maneuver the pod in its path of descent.

There are, in the pod, three essential sections. Section 401 may be at the rear of the pod and houses the bobbin described briefly above. The bobbin feeds tether line out the rear of the pod. The feed of the tether line is substantially friction free, so the feeding of the tether from the bobbin has little or no effect on the flight path of the pod. In another embodiment the tether may be fed from the aircraft via controlled winch or similar bobbin feed.

Section 402 of pod 110 houses a packed parachute that enables an individual in a later extraction process to eventually parachute to a safe area or be deployed in case of emergency. Section 403 houses an extraction harness, including a vest and peripheral equipment, for the individual to be extracted. The harness may be anchored to the tether at a point on the harness that allows the individual, when extracted, to remain upright and aware of surroundings. The harness also comprises radio circuitry and power supply that enables the individual to communicate with the pilot of aircraft 100 during the extraction process, for instance, to notify the pilot that the individual is ready to be lifted and extracted.

In some embodiments the pod has a CPU and digital circuitry 405 for performing a number of functions. Grid fins 404 may, in some embodiments be movable independently to slow the pod, speed up the pod, or to urge a change in direction for the pod. In the steerable embodiments the pod may also comprise radio communication circuitry, whereby the pod may interact with software in the fixed-wing aircraft, The systems in the aircraft may, for example, track trajectory of the pod, determine deviation from desired trajectory, and may manipulate drag fins 404, for example, to correct trajectory. A critical element in the system is a bobbin in section 401 of the pod that presents the tether 120 in a manner to feed the tether out of the rear of the pod as the pod descends.

FIG. 5A illustrates a core 502 upon which tether line may be wound to create the bobbin. In this example the core has a circular cross section but is not strictly cylindrical. The core is larger in diameter on one end than the other, to be somewhat cone-shaped, but may not be strictly conical. In this example the cone is inclined. FIG. 5B illustrates tether line 120 wound on the core of FIG. 5A. The wound line removed as a unit from core 502 forms bobbin 503 which is installed in section 401 of pod 110.

Figure 5C:
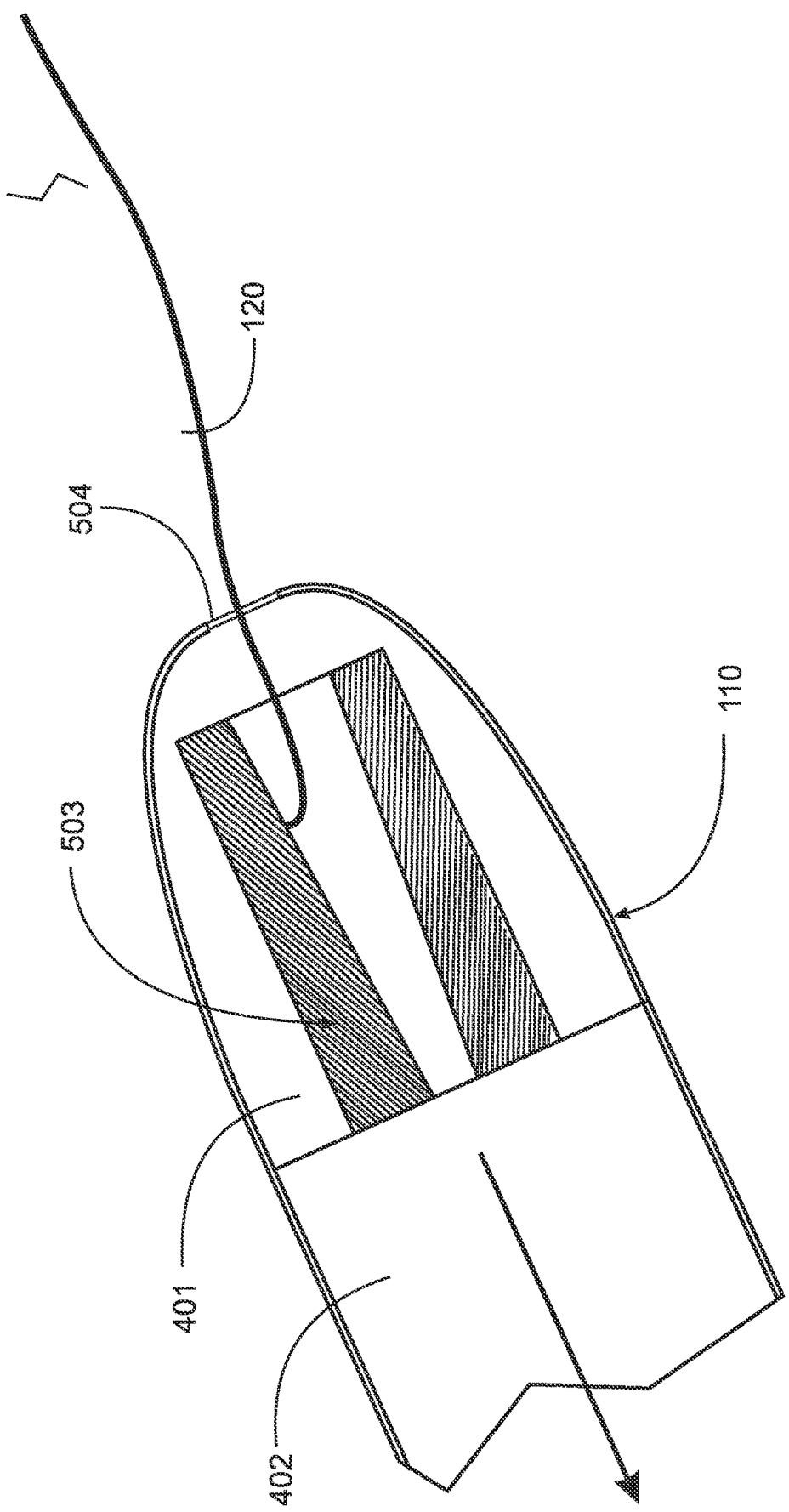
FIG. 5C illustrates the bobbin of FIG. 5B feeding tether line from a pod in an embodiment of the invention.
Figure 5D:
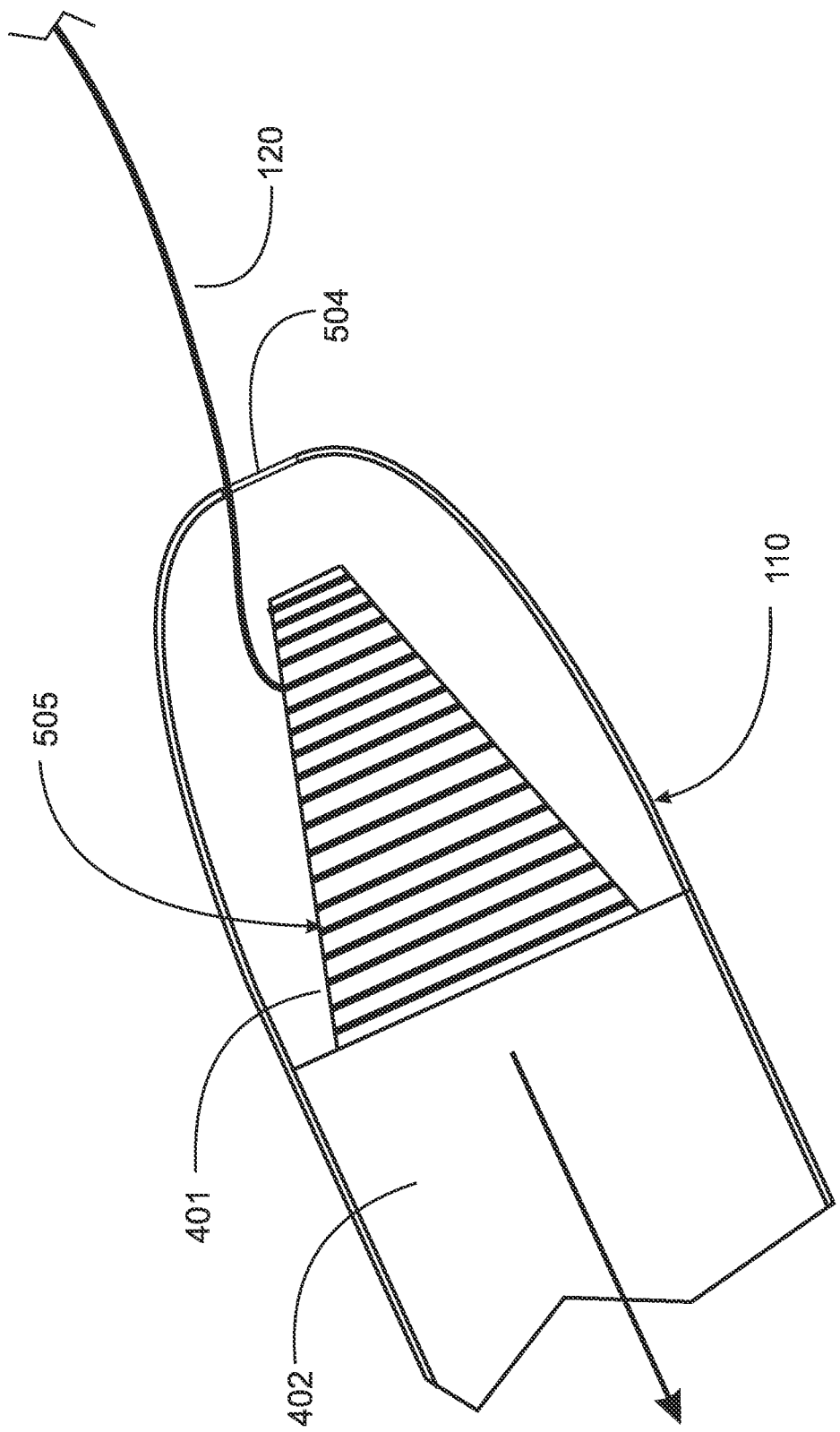
FIG. 5D illustrates another embodiment of a bobbin feeding tether line from a pod.

FIG. 5C is an illustration of bobbin 503 removed from core 502 and placed in section 401 of pod 110 and is presented in cross-section to illustrate some important features. Tether line 120 unwinds from the inside of bobbin 503, which the inventors have found to present the least friction, essentially none. It is important that the feeding out of tether line from the bobbin does not assert any force on pod 110 as it descends, which would tend to alter the path of descent. FIG. 5D is an illustration showing the tether line 120 unwinding from an outside of bobbin 505.

Figure 6:
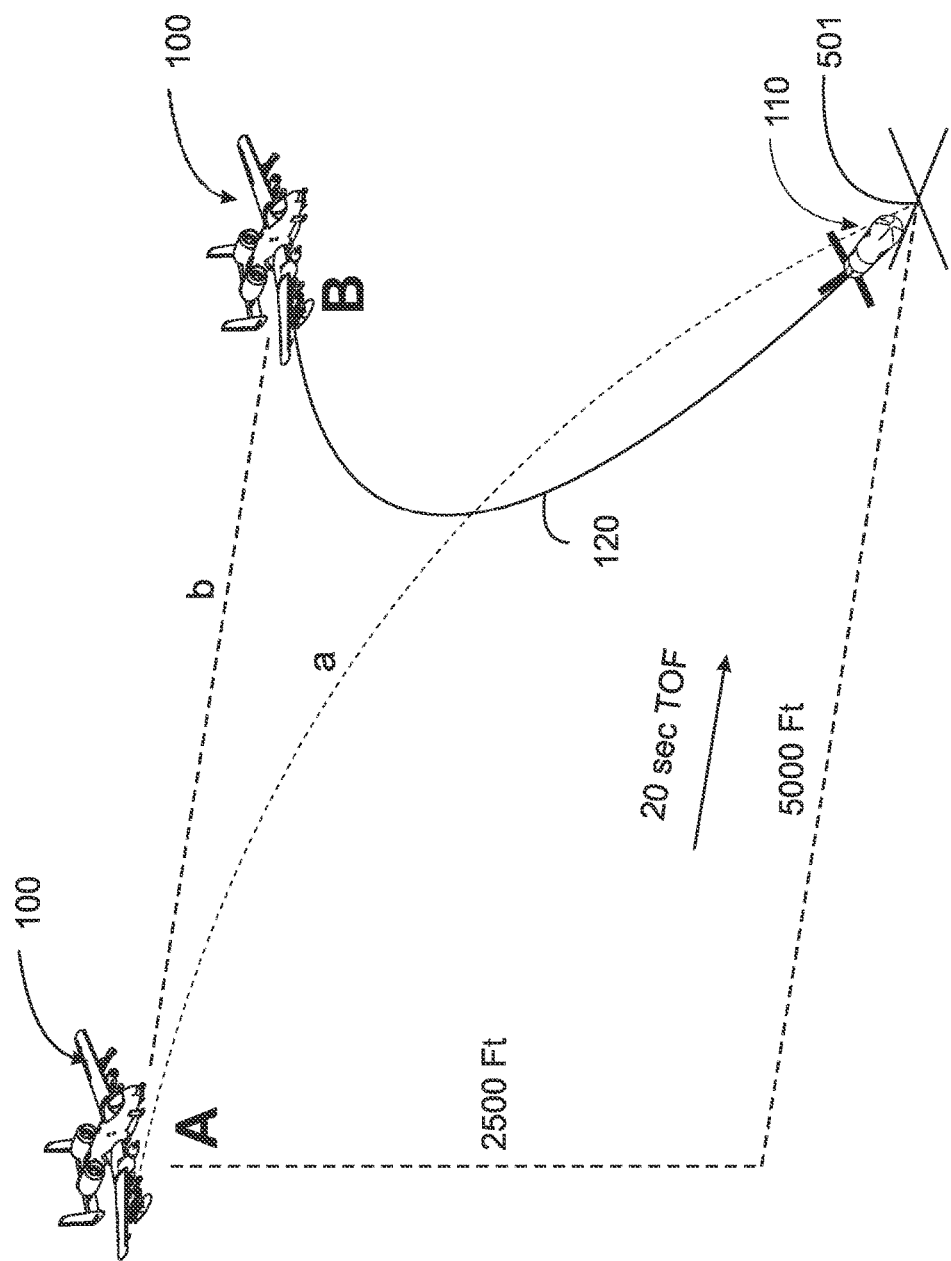
FIG. 6 is an exemplary diagram showing detail of dropping a pod to a location in an embodiment of the present invention.

FIG. 6 is an illustration of the overall process of releasing and dropping pod 110 by aircraft 100 to a predetermined point 501 on ground surface. FIG. 3 illustrated a momentary point in this process. In the particular example of FIG. 6 aircraft 100 has released pod 110 at point A at an altitude of 2500 ft., and at a distance of 5000 ft. from desired point 501. By predetermined point is meant a point whose coordinates have been transmitted to aircraft 100, to a software system operating in concert with touchscreen controls 200 as seen in FIG. 2. An individual to be the subject of extraction has transmitted the coordinates with aid of a GPS system as a part of equipment that the individual has on his or her person.

The pilot of aircraft 100 has entered the coordinates into the Rapid Aerial Extraction System (RAES) system on board, which returns to the pilot necessary data for performing the extraction. For example, various real-time data is employed by the RAES software system, such as wind conditions, model and weight of pod 110, and model and capabilities of aircraft 100, among possibly other data. In this particular example, the RAES system has determined that the release is to be at 2500 ft. and at 5000 ft. from the end point. The skilled person will understand that these numbers may vary considerably based on a number of factors.

In FIG. 6 trajectory "a" is the path of pod 110 in free fall. Path "b" is the straight line path of aircraft 100 after releasing the pod. The time of flight (TOF) is calculated to be twenty seconds in this particular example, and aircraft 100 is calculated to be directly over point 501 at 2500 ft. altitude as pod 110 approaches ground point 501. At twenty seconds after release aircraft 100 performs a climbing turn into a circular orbit at a somewhat higher altitude. The exact specifics of the change in course and altitude has been determined by the RAES system based upon all the predetermined and real-time data available.

Figure 7:
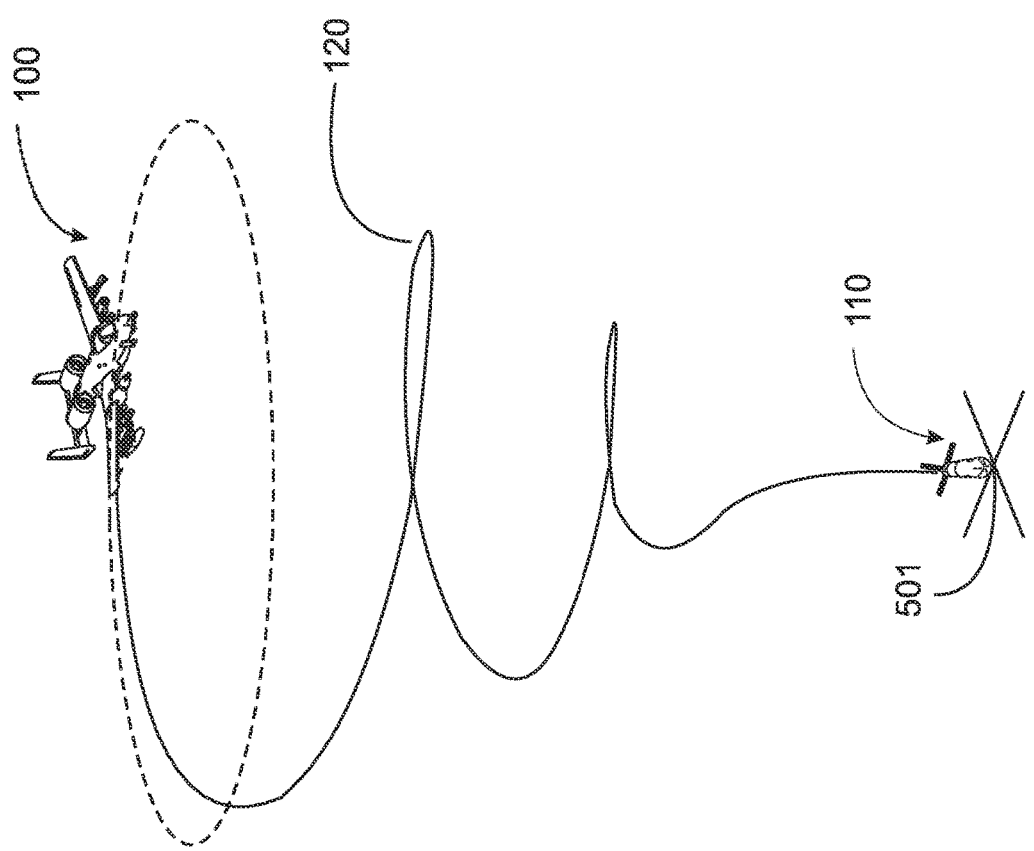
FIG. 7 is an illustration of a pod at a point at ground level and a tether in a spiral to a fixed-wing aircraft in orbit over the point of the pod.

FIG. 7 illustrates a result of the climbing turn, and the attainment of a circular orbit, indicated by dotted line, at a specific altitude according to all of the data available in the method and system described. The result is termed a gravity well, in which tether 120 assumes a spiral pattern terminating at pod 110 at one end and at the anchor point on aircraft 100, in this case under the wing where the pod was carried. The geometry of the spiral is a result of the velocity of aircraft 100, the diameter of the circular orbit, the altitude of aircraft 100, and the weight of pod 110, among possibly other data points. Tension in tether 120 at the connection to pod 110 is vertical, and just sufficient to support pod 110 without movement.

In one embodiment there may be sensors in pod 110 that transmit to the RAES system in aircraft 100 such things as tension in tether 120, height of pod 110 above the surface, relative sideways movement, and so on. Minor adjustments in altitude of aircraft 100, velocity, turn radius, and the like may be calculated and accomplished to place pod 110 stationary at point 501, and to maintain that position while aircraft 100 continues in a circular orbit.

Figure 8:
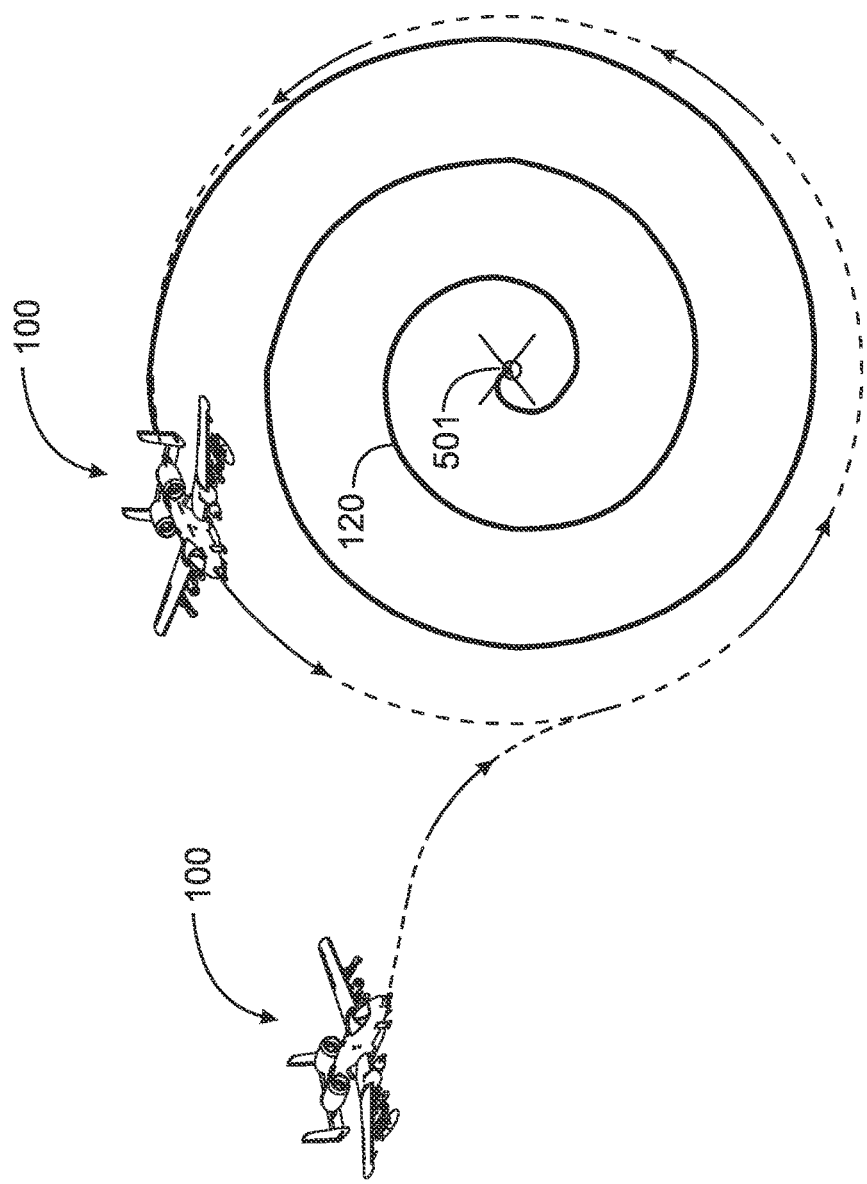
FIG. 8 is a plan view of an aircraft in circular orbit and a tether in a gravity well configuration to a pod at ground level.

FIG. 8 is a plan view from above the circular orbit of aircraft 100 illustrating an example of entry of the aircraft into the orbit, and the spiral of tether 120 that results. Delivery of the pod is not necessarily automatic. It is not intended that the pod strike the ground as would a bomb of the same size and weight. To do so might well destroy the pod and the elements inside. Rather, the speed of the aircraft, the altitude, and the entry into the spiral are calculated and performed to bring the pod rather gently to ground point 501. To accomplish this feat it is necessary that critical maneuvers of the aircraft be performed while (during a specific time window) the pod is in free fall toward point 501. The aircraft establishes the circular orbit and the tether is the resulting spiral before the pod is lowered to the ground, which may be done by a gradual lowering of the altitude of the aircraft in its orbit, or flying a tighter/smaller orbit, or feeding additional tether from the pod or aircraft.

Once pod 110 is at point 501 the individual to be extracted is responsible to open the pod, which may be done in certain embodiments by releasing panels in an outer shell. This provides access to the extraction and parachute harness inside section 403 (see FIG. 4). The individual may attach the harness to tether 120 and subsequently release remnants of pod 110 from the tether. After freeing the harness and attaching same to the tether, the individual must don the harness, and in some cases other gear, prior to the extraction.

Figure 9:
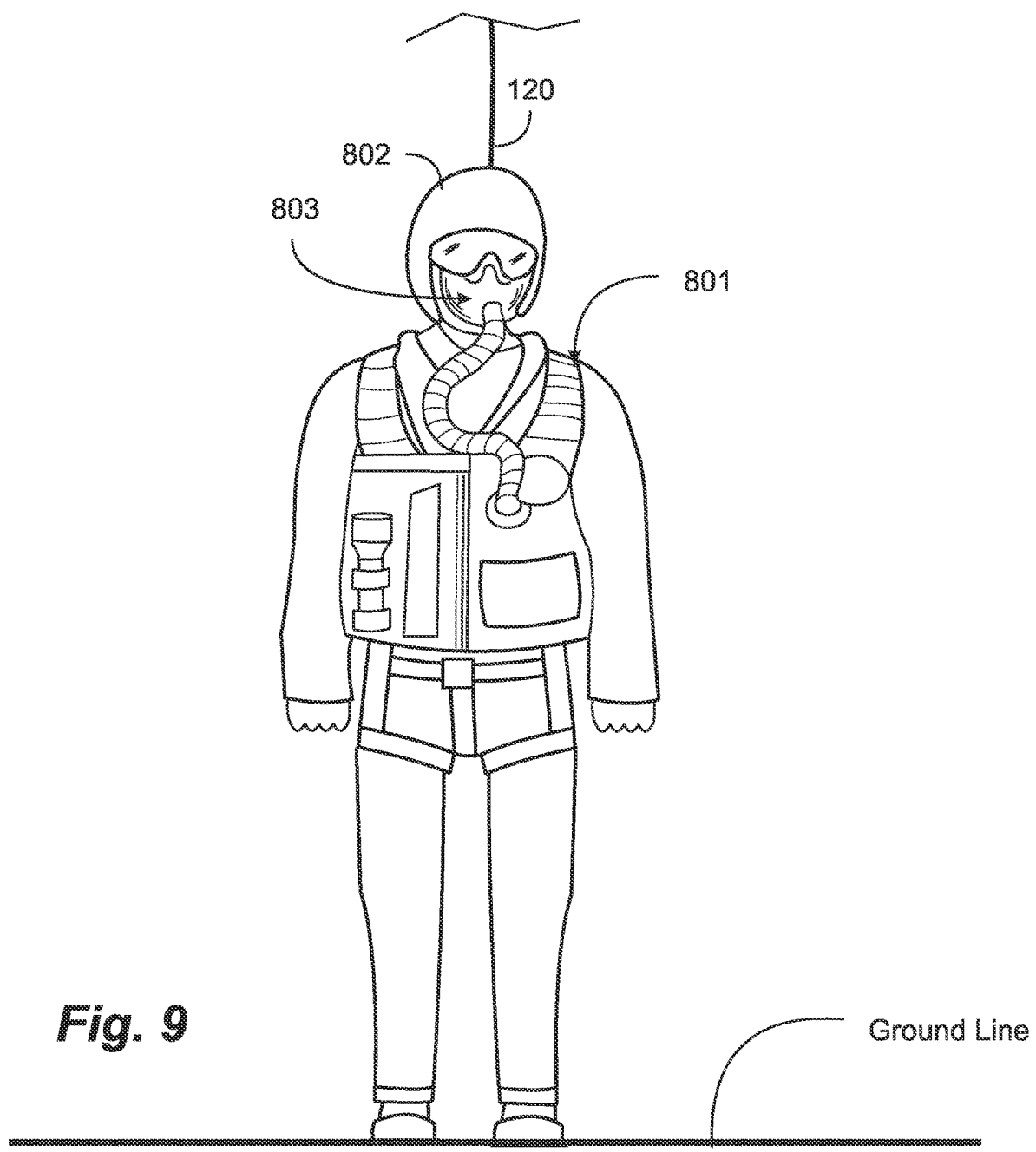
FIG. 9 is a view of an individual having donned a rescue vest prior to extraction by tether to a fixed-wing aircraft in an embodiment of the invention.

FIG. 9 illustrates an individual having donned a harness 801, and additional elements, such as a helmet 802 and an oxygen mask 803. Tether 120 is seen extending above the individual in the harness, and is attached at the back of the harness, not seen in FIG. 9. At this point in time it is assumed that the individual is ready to be extracted, and the harness apparatus has, as indicated above, radio circuitry by which the aircraft may be contacted.

Figure 10A:
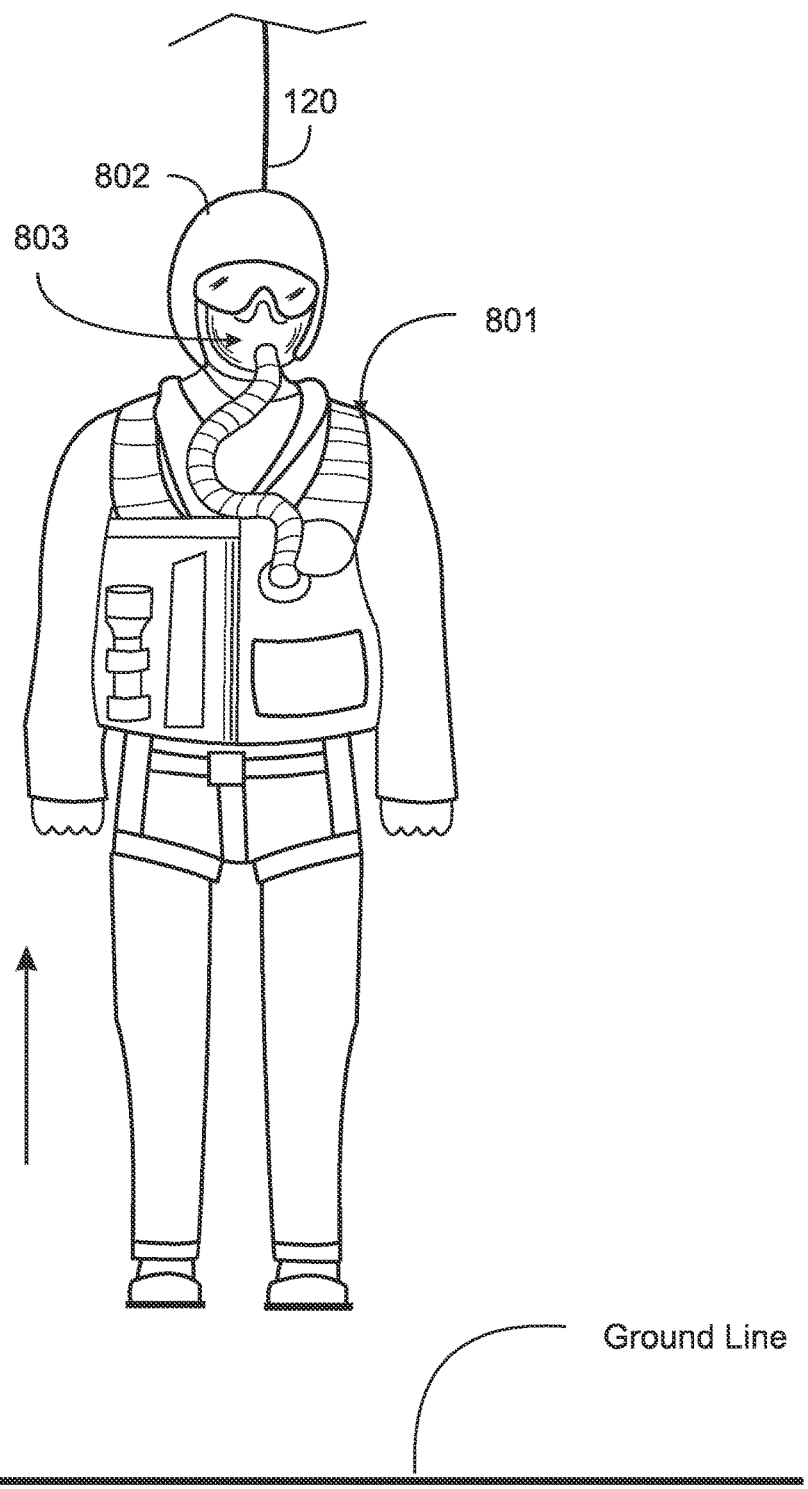
FIG. 10A is an exemplary view of the individual of FIG. 9 in process of extraction by the fixed-wing aircraft in an embodiment of the invention.

FIG. 10A illustrates the individual in harness from FIG. 9, beginning the extraction journey. To accomplish the lift the circling aircraft may gradually begin to gain altitude in the circular orbit, or may simply extend the diameter of the orbit at a controlled rate, either of which will gradually increase tension in tether 102 to a point that an upward force equal to the weight of the individual in the harness is counterbalanced. Further adjustment will lift the individual in the harness from the ground as shown in FIG. 10.

Figure 10B:
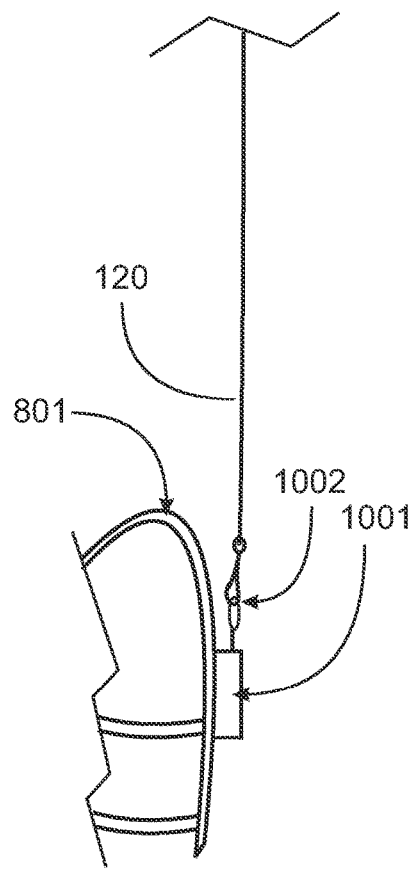
FIG. 10B is illustrates the attachment location of the tether and tension sensor to the harness.

FIG. 10B is a side view of just a back portion of the harness 801 worn by the subject in FIG. 10A, illustrating a tension sensor 1001 firmly fastened to the back of the harness. Tension sensor 1001 is coupled to tether 120 by a clip connector 1002, which the subject may connect in the process of donning the harness.

A very important advantage of the unique manner the individual is lifted off the ground is the gentle force which enables the individual to not experience injuries during the lift. Prior to applicant's invention, these types of lifts from a fixed-wing aircraft would cause grave injuries because of the blunt force at lift-off caused by the speed of the aircraft not implementing applicant's system. Typically, with applicant's unique method and system of lifting the individual off the ground, as in FIG. 10, causes a lifting force at the harness of 1.1-1.4 g. In this manner, no injuries are experienced by the individual being lifted and less stress applied to the aircraft.

In one embodiment of the invention there may be a tension sensor in line with tether 120 near the connection to the extraction harness (not shown). The tension in tether 120 at or near harness 801 may be communicated to the aircraft as input to determine flight characteristics. Maneuvering the aircraft to control tension in tether 120 is seen as a good way to accomplish extraction while maintaining a safe range of G force.

Figure 12:
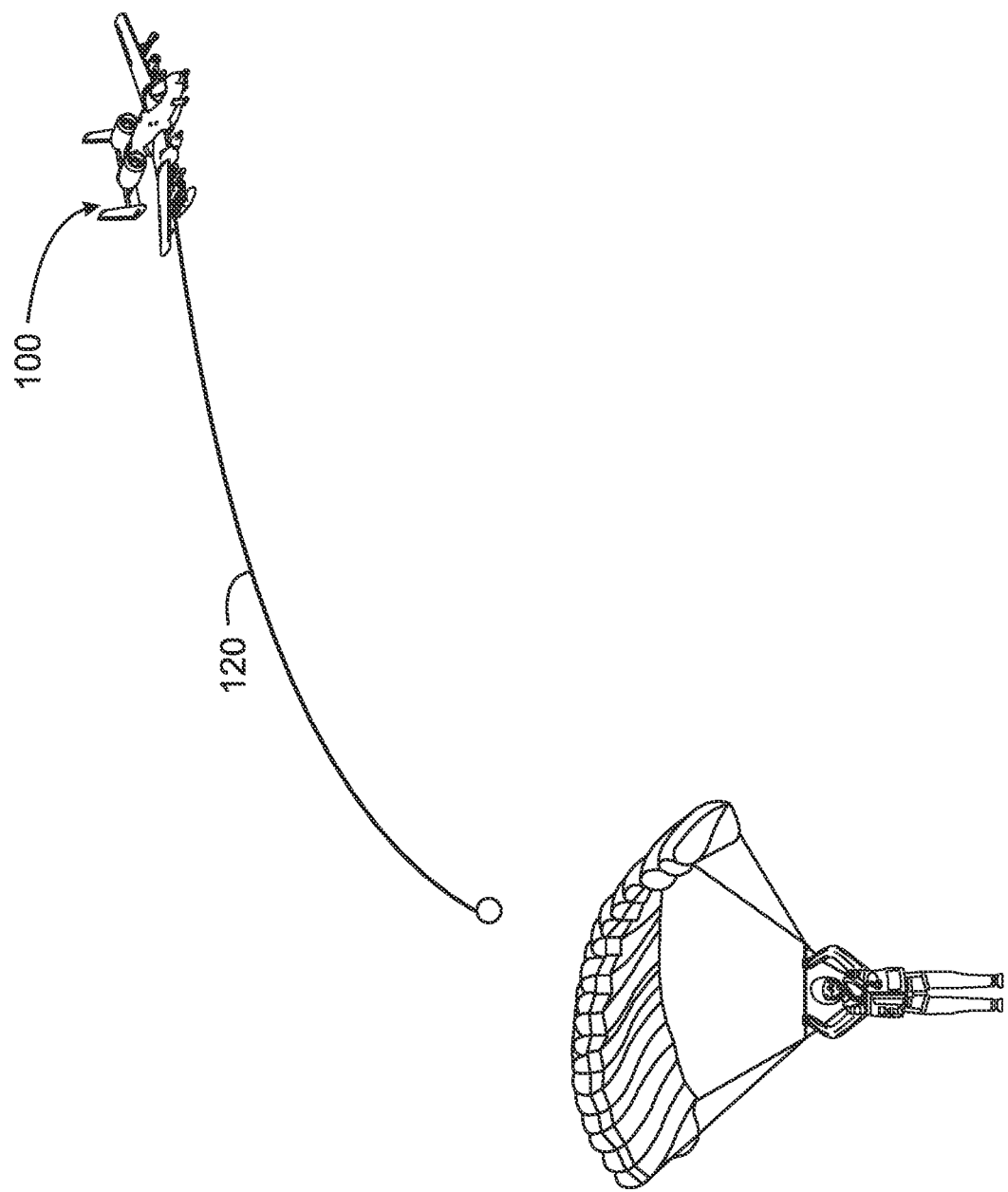
FIG. 12 illustrates the individual of FIG. 11 having released the tether and opened the parachute.

At some point the aircraft leaves the circular orbit in a roll-out maneuver preferably toward a heading to a safe drop zone or delivery point for the individual being extracted. FIG. 11 is an illustrating of aircraft 100 having left the orbit, and the individual being extracted on tether 120. The roll-out has an effect of gradually raising the subject in the harness from the ground position. The tether has not, at this time, fully drawn out of the spiral of the gravity well. In FIG. 12 the aircraft and individual have reached a safe zone, and the individual has released the tether and has employed the parachute to descend to the ground in the safe zone. After this release the aircraft may release the tether from the anchor point on the aircraft as well, and the extraction is complete.

Figure 13:
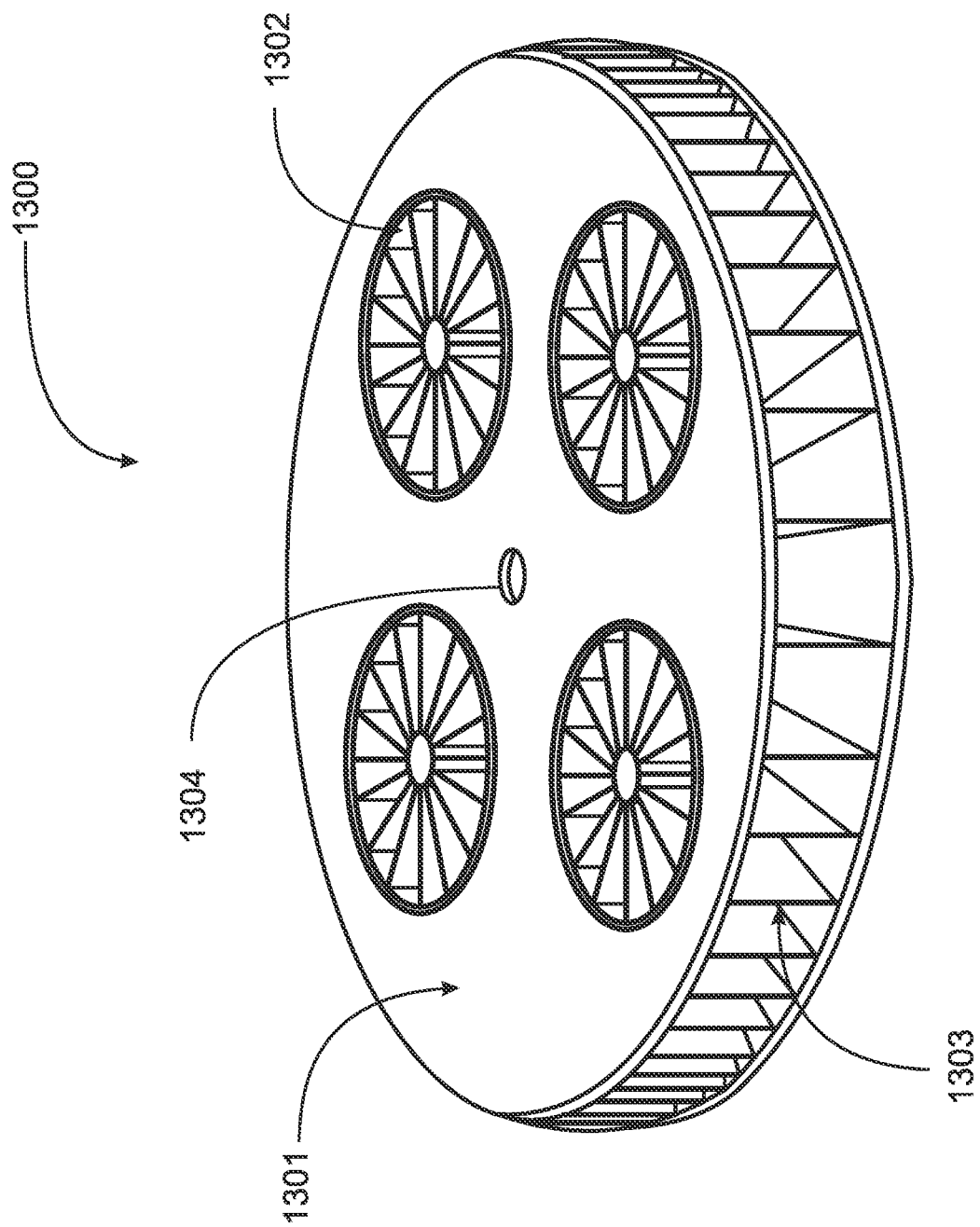
FIG. 13 is a perspective view of an example stabilizer apparatus for use in various embodiments of the invention.

FIG. 13 is a perspective view of a stabilizer apparatus 1300 for use in various embodiments of the invention. Apparatus 1300 is a relatively small unmanned aerial vehicle (UAV) that interfaces with the tether in embodiments of the invention through center opening 1304, which passes vertically through body 1301 of the UAV. There are, within the body described more fully below, drive elements that engage the tether, and enable the UAV to climb the tether or to descend on the tether. UAV 1300 has, in this example, four fans 1302 that are the drive elements that facilitate flight for the UAV, similar to other UAVs. There are further, in this example vanes 1303 that may direct air from fans laterally, and which may be managed to help maneuver the UAV. Variations may occur in number of fans, vanes and variations in direction of air flow of those fans without departing from the purpose and function of UAV 1300.

Figure 14:
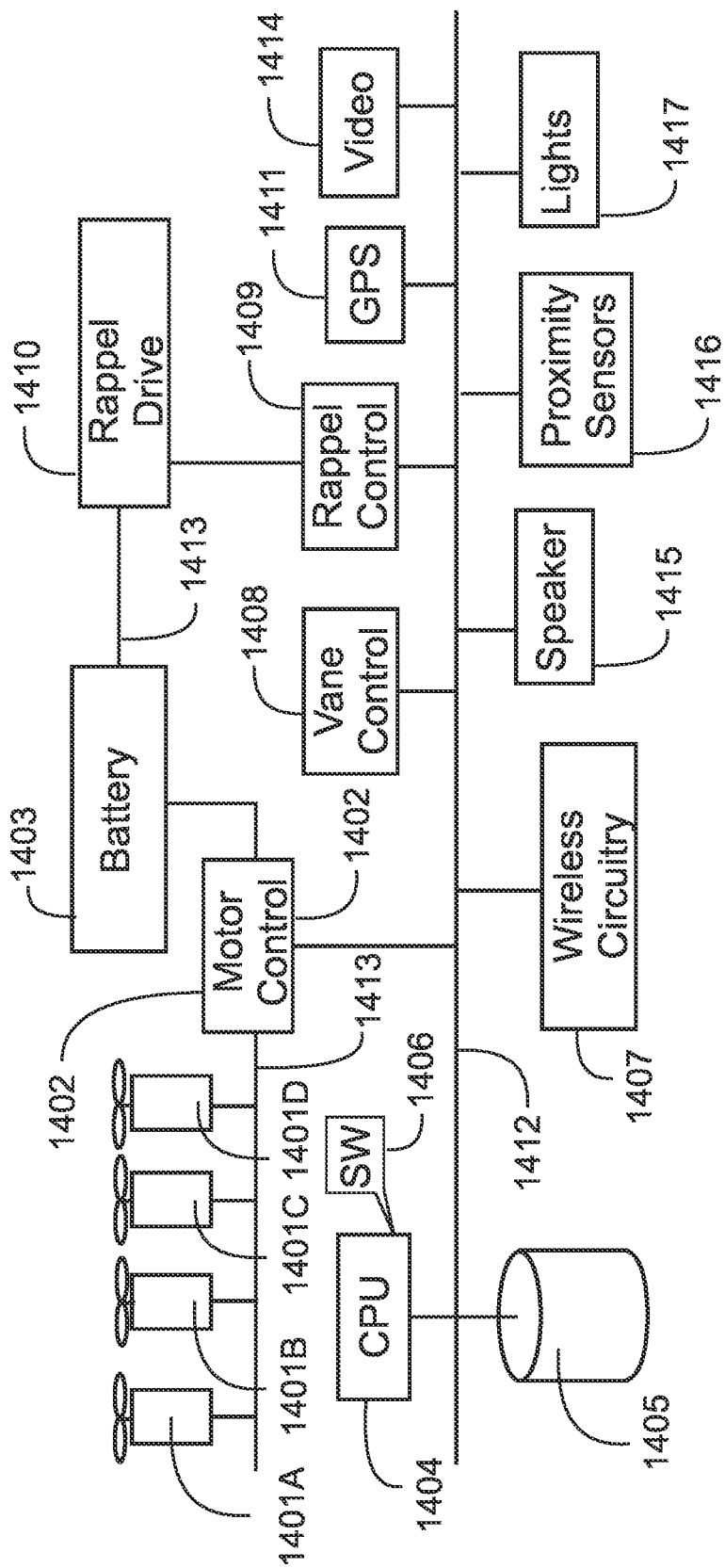
FIG. 14 is a diagram of elements internal to the stabilizer apparatus of FIG. 13 in one embodiment of the invention.

FIG. 14 is a diagram as an example of elements internal to UAV 1300 in one embodiment. DC motors 1401 A, B, C and D are coupled to fan blades for the fans 1302 of FIG. 13. The fans are powered in this example by a DC rechargeable battery 1403 though power lines 1413, with power controlled by motor control circuitry 1402 in a manner that the fans may be individually driven at different speeds in different directions if desired. This control feature enables the UAV to be flown in all degrees of freedom.

Wireless circuitry 1407 represents communication apparatus enabling UAV 1300 to communicate with the fixed-wing aircraft and the subject to be extracted, and further to download coded instructions from the fixed wing aircraft. SW and control functions are provided enabling a responsible person in the fixed-wing aircraft, or in some instances the subject to be extracted, to command functions in the UAV.

UAV 1300 comprises a speaker 1415 through which announcements, alerts and the like may be enunciated. Lights 1417 may be of several forms and may be turned on and off automatically and manually. Proximity sensors 1416 provide positional information and can aid in avoiding obstacles. Rappel drive 1410 enables the UAV to ascend or descend on the tether and enables locking the UAV to the tether as well. Control in rappelling is through control 1409, which manages motors in rappel drive 1410. GPS 1411 provides geographic location needed in maneuvering and location. Video system 1414 has one or more video cameras which may be accessed by persons in the aircraft to aid in precise maneuvering of the UAV, and hence of the tether and payload that may be attached to the tether.

Motor control 1402 and all other functions of the UAV are managed by SW 1406 executing on CPU 1404 from data repository 1405. Electronic elements are interconnected by a digital bus 1412, which interconnects all digital circuitry.

UAV 1300 also comprises vane control circuitry 1408, managed by SW 1406, to control vanes 1303 and rappel control 1409 managed by SW 1406 to control rappel drive 1410 to enable the stabilizer apparatus to climb and descend on tether 120. There is additionally GPS circuitry 1411 in this example providing geographic location coordinated for the UAV. In some embodiments there may further be video cameras and camera controls for direction and focus, represented by element 1414, to aid in navigation of the UAV, and consequently of the pod.

Different embodiments of the UAV stabilizer may be accomplished in a variety of designs and with a variety of control and drive elements to accomplish the functionality needed in the invention. The specific elements and interactions described here are entirely exemplary.

The skilled person may see from the diagrams in descriptions that UAV may be remotely controlled by systems in the fixed-wing aircraft in embodiments of the invention through SW executing in the aircraft and commands by responsible persons in the aircraft, through wireless communication radio circuitry. In some embodiments the UAV may be influenced by communication from the surface in equipment controlled by a person sought to be rescued. The UAV may also be programmed to home on signals from the pod dispatched to the point where a person is to be extracted.

Figure 15:
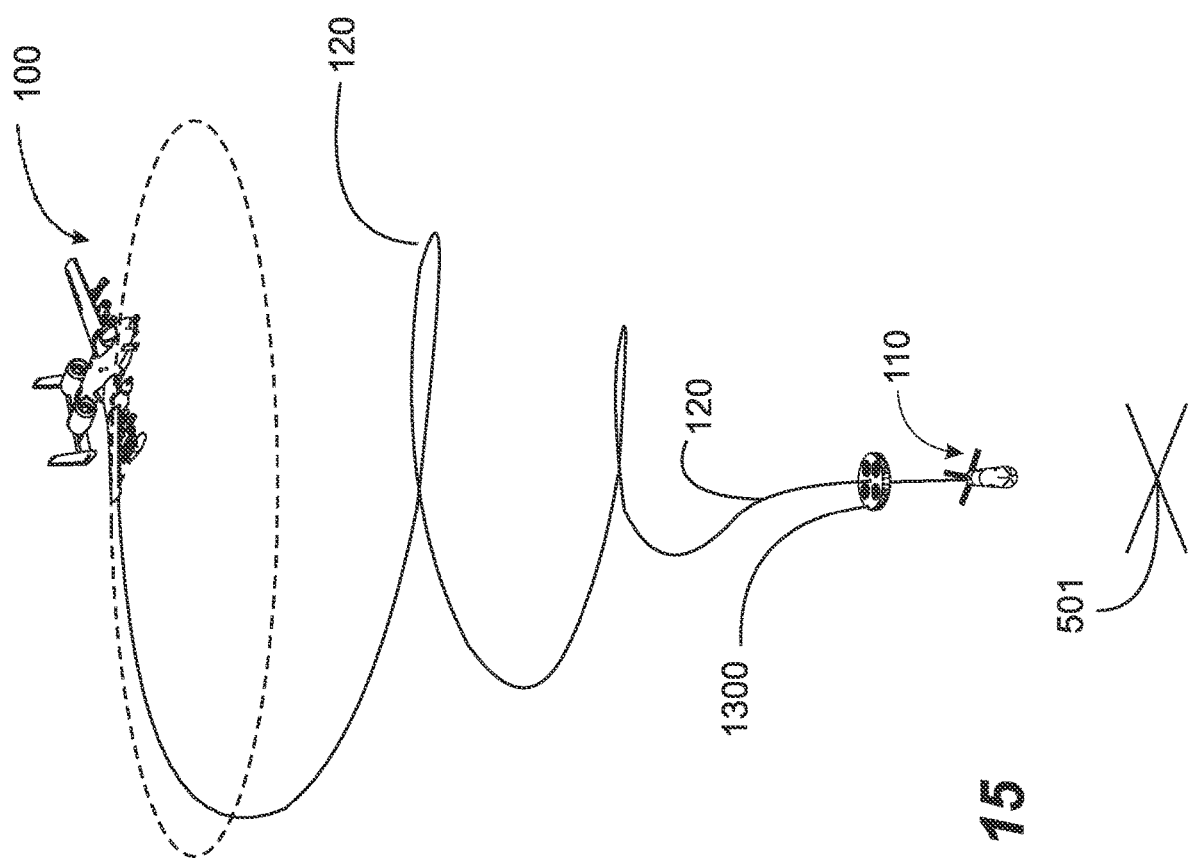
FIG. 15 illustrates delivery of a pod with aid of a UAV stabilizer in an embodiment of the invention

FIG. 15 illustrates a delivery for a pod 110 by a fixed wing aircraft 100 and tether 120 in a gravity well, wherein the aircraft circles at a specific speed at a specific radius over a delivery point 501, and lowers the pod to the surface. In this example a UAV stabilizer 1300, as described above, is interfaced with tether 1300 at a point on the tether a relatively short distance above pod 110. A pilot or other responsible person in the aircraft may command the UAV remotely in a process of bringing the pod to the desired point. The UAV may intercept signals from the pod as well. The pilot may also utilize the video cameras in the process.

The addition of the maneuverable stabilizer UAV is in some case to provide very precise delivery in situations where a person can be evacuated, or where material may be desired to be delivered or retrieved, in such as urban settings, where the system may need to lower a pod on a tether between buildings or other structures, and precise maneuverability may be needed. The same may be true in extractions or retrieval in situations where the person to be retrieved or the material is in a lake or open sea situation.

In embodiments using stabilizers 1300, tether feed from a bobbin may in some cases be appropriate, but in some other cases feeding the tether from a winch (described below) in or on the aircraft may be appropriate.

It should be noted that the UAV 1300 is enabled to climb and descend on the tether by virtue of rappelling elements interfaces with the tether. In some circumstances it may be desirable to position the UAV very close to the pod, so the pod may be moved laterally almost directly, and in some instances the UAV may be more advantageously positioned at a further distance above the pod. In many case, the UAV may be utilized while the pod is above the surface, and lateral positioning is accomplished by maneuvering the UAV, and then the pod may be lowered by lowering the UAV, or feeding tether from the UAV via the rappelling elements to lower the pod.

Once the pod is delivered to the desired position, and the person, equipment or material is ready to fly, the pod, in most cases has not sufficient lifting power to lift the person, material and/or equipment from the surface. In this instance, the UAV may certainly provide some extra lifting power to the tether, and may keep the person, material and/or equipment ascending in a safe and straight path. In an urban extraction, for example, perhaps between buildings, the maneuverability of the pod and the advantage of the video cameras and proximity sensors may be critical to success.

Figure 16:
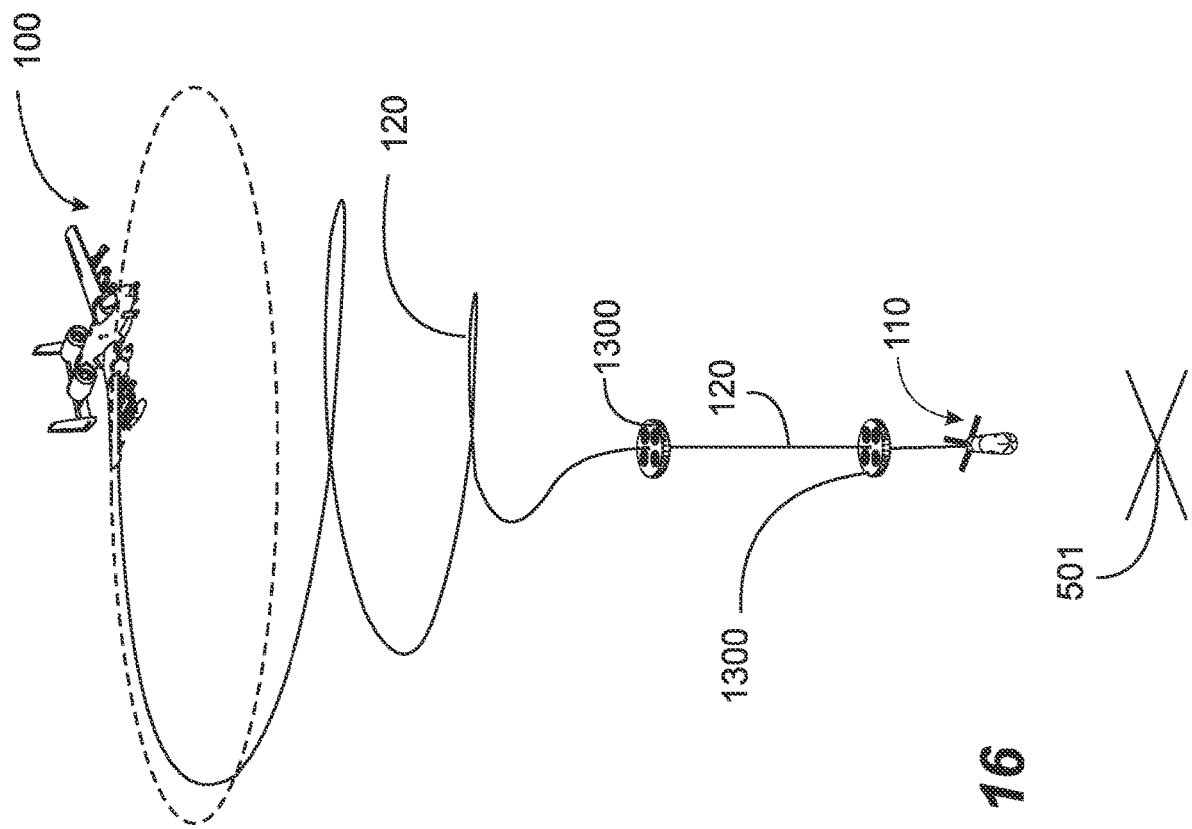
FIG. 16 illustrates delivery of a pod with aid of two UAV stabilizers in an embodiment of the invention.

FIG. 16 illustrates delivery of a pod with aid of two UAV stabilizers in an embodiment of the invention. In the situation depicted by FIG. 16 one UAV stabilizer 1300 is positioned on tether 120 just above pod 110, and another UAV 1300 is used at an altitude substantially higher. The UAVs, of course, may be maneuvered independently, with the upper providing course positioning while the lower provides more precise positioning. The two together may also provide additional lift in the extraction process with the upper UAV impacting the size of the lasso in the upper part of the tether causing the bottom of the tether to raise or lower to the ground similar to how pulling on a bow string shortens the distance from the top and the bottom of the bow string.

Operation with one or two UAVs will typically comprise delivering the pod first to a course location at an altitude above the desired delivery point. The UAVs then are used and piloted remotely to position the pod precisely. Then the pod is lowered to the delivery point, which may be done by altitude adjustment of the aircraft, and may be aided by maneuvering the UAVs.

In the extraction process UAVs may be used, especially in critical situations, to help fly the extraction package to a safe altitude away from any buildings or other structures, and then may be powered down and may be locked to the tether by the rappelling elements. The UAVs may also be descended on the tether to be close to the extraction package so they do not cause unnecessary forces on the tether. The extraction proceeds much as described above for the case where there are no UAVs, with the aircraft ascending and pulling out of the circular orbit. In many embodiments tension in the tether is monitored by one or more sensors, particularly at the interface to the extraction package, such as the harness donned by a person to be extracted. The process is one of gradually increasing the tension in the tether until the weight of the extraction package is overcome, and then further increasing the tension to lift the package from the surface, and to gradually accelerate the package upward and then away toward a safe drop zone.

In an alternative embodiment of the invention extraction is practiced from a larger, transport-type fixed-wing aircraft, using a winch through a cargo door, and the extracted subject may be retrieved from an extraction point into the aircraft, rather than parachuting to a safe zone as described in other embodiments above, which may be practiced from an attack aircraft, such as an A-10.

Figure 17:
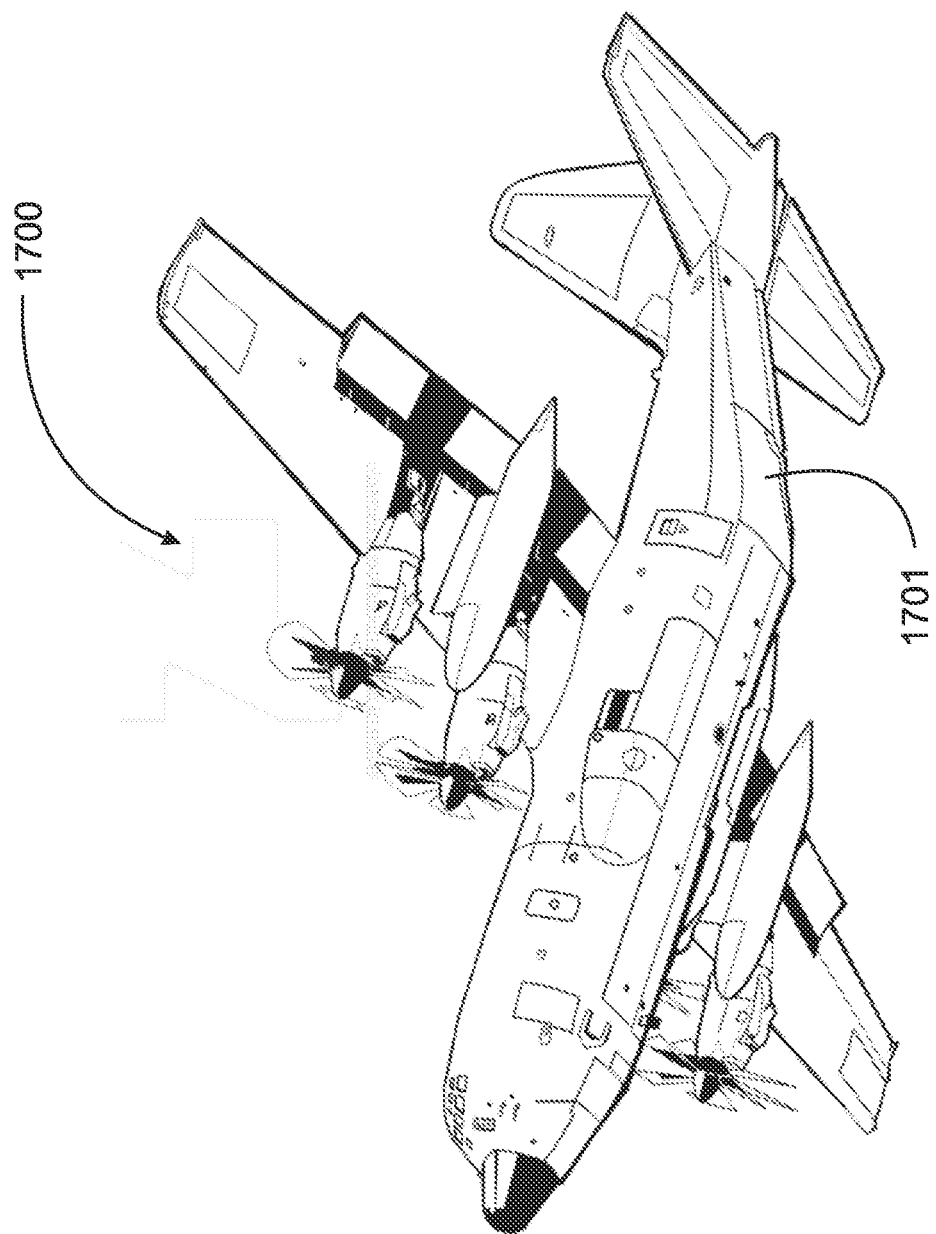
FIG. 17 is a perspective view of a transport aircraft of a sort that may be used in winch-enabled embodiments of the invention.

FIG. 17 is a perspective view of a transport aircraft 1700 of a sort that may be used in winch-enabled embodiments. Aircraft 1700 in this figure is a C-130 model transport aircraft, but many transport-type aircraft may be used. Requirements are a cargo bay large enough to accommodate equipment to be described below, and a cargo door 1701, preferably facing to the rear as in this example, that may be used for deployment and retrieval.

Figure 18:
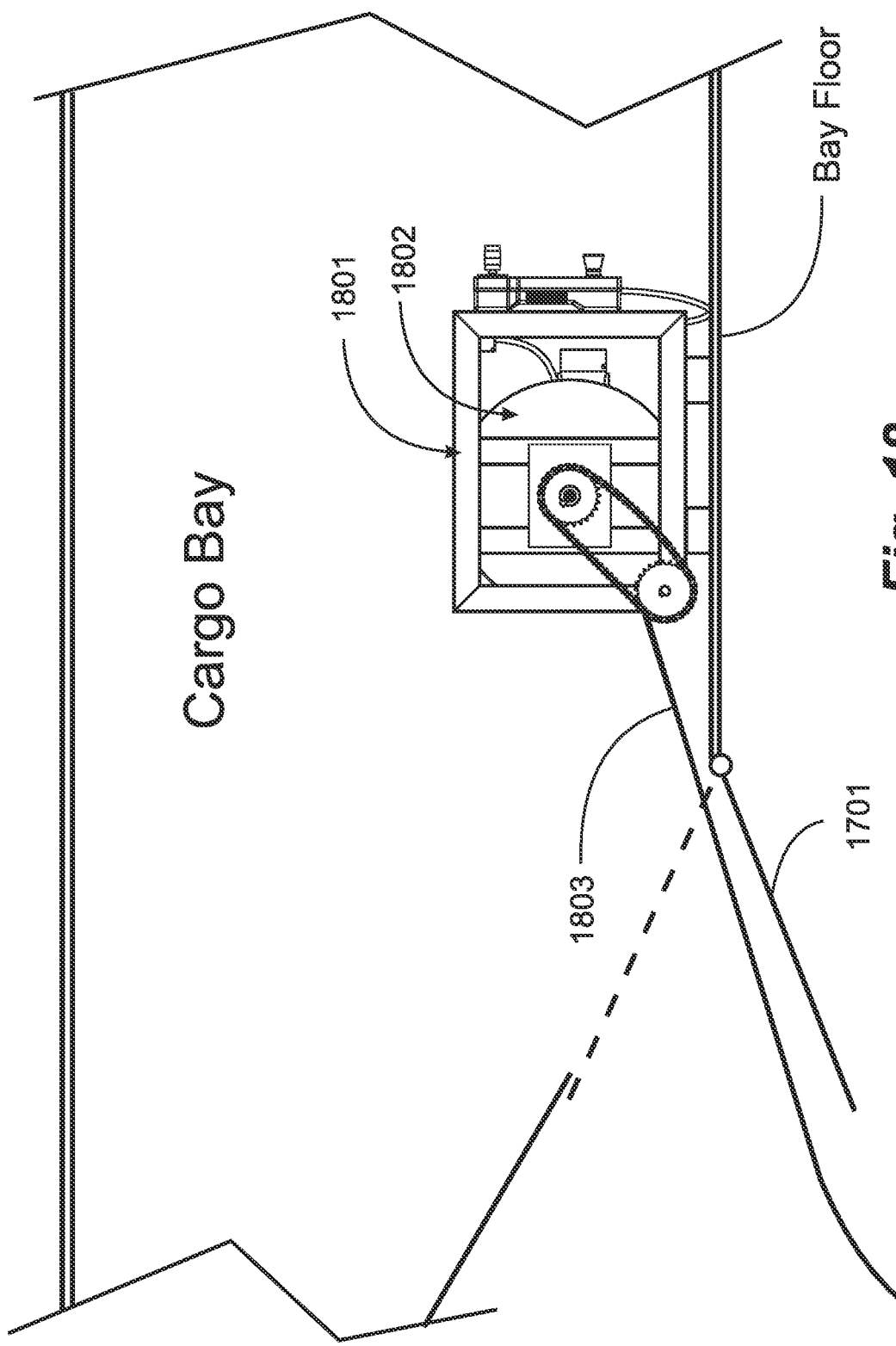
FIG. 18 is a cut-away view of a winch apparatus 1801 having a drum 1802 in an embodiment of the invention.

FIG. 18 is a cut-away view of a winch apparatus 1801 having a drum 1802 in an embodiment of the invention, the winch deployed in a cargo bay of aircraft 1700, near cargo door 1701, to feed and retrieve tether line 1803 in a rescue operation. Winch 1801 may be mounted to a bay floor of the aircraft 1700 in this embodiment. Drum 1802 is of a length and diameter that several thousand feet of tether line 1803 may be wound on the drum, deployed out door 1701, and later retrieved and wound back on to drum 1802.

Figure 19:
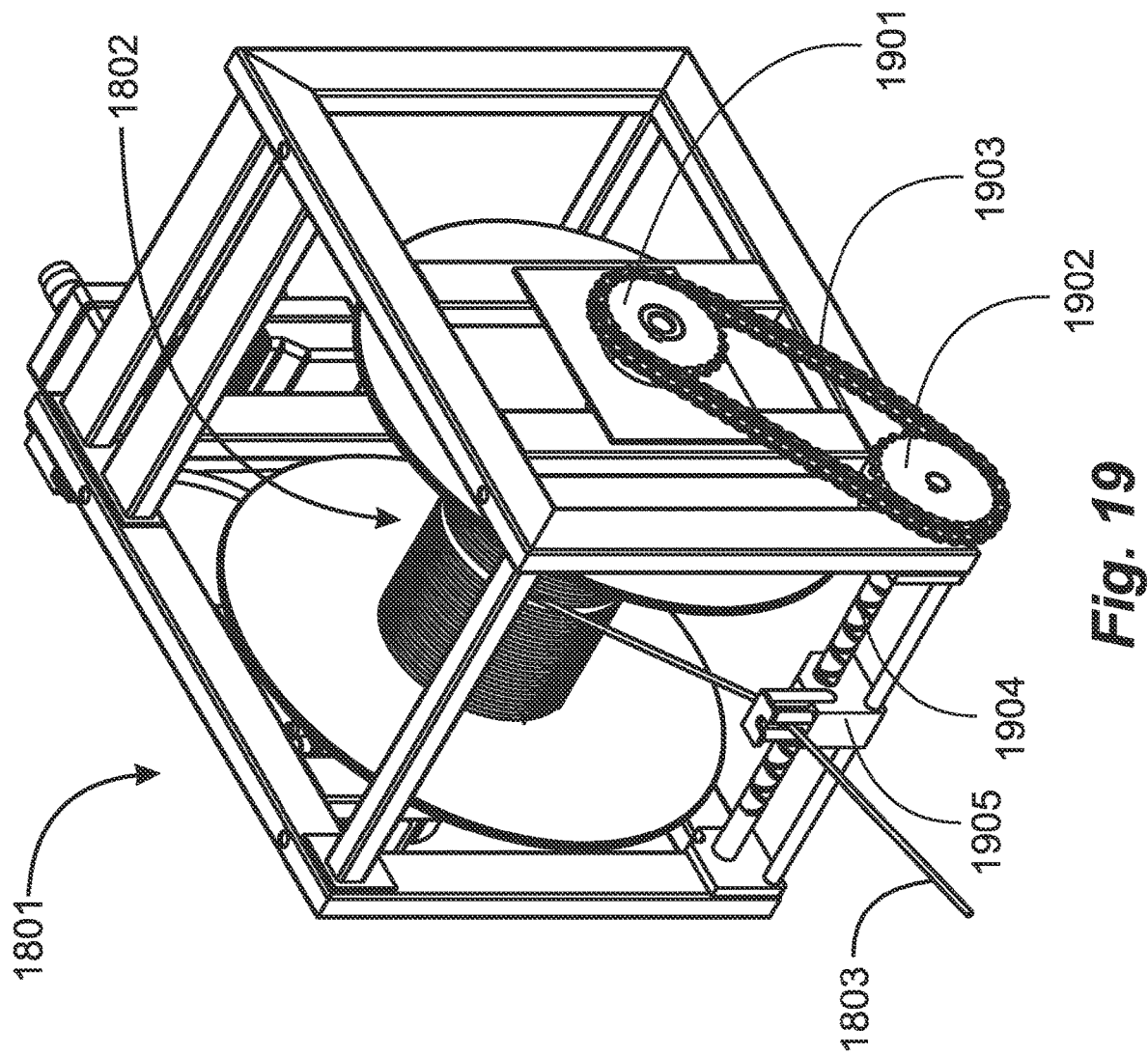
FIG. 19 is a perspective view of a winch from an angle in front to one side of the winch.

FIG. 19 is a perspective view of winch 1801 from an angle in front to one side of the winch. Drum 1802 operates on a shaft that has a chain sprocket 1901 engaged by a chain 1903 with a sprocket 1902 on a shaft at lower front of the winch. The lower shaft drives a cam shaft 1904 with grooves that are followed by a guide block 1905. The geometry is such that guide block 1905 traverses left to right and right to left in the direction of the axis of drum 1802, in a manner that guides the feeding or winding of drum 1802 to keep tether line 1803 evenly wound on the drum, regardless of whether feeding tether line or retrieving it.

Figure 20:
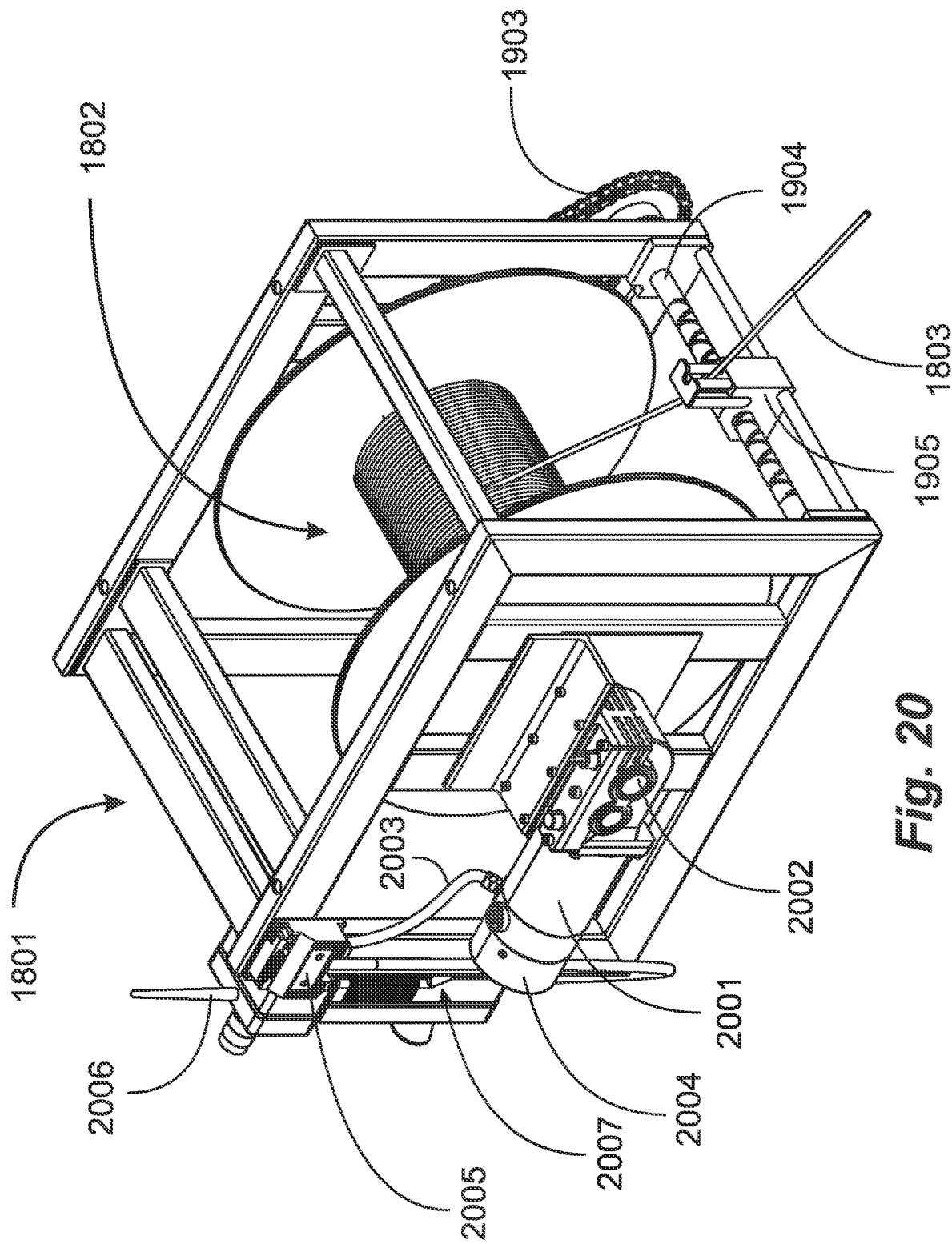
FIG. 20 is a perspective view of a winch from a viewpoint in the front to the opposite side of that of FIG. 19.

FIG. 20 is a perspective view of winch 1801 from a viewpoint in the front to the opposite side of that of FIG. 19. This view shows elements on the side opposite chain 1903 that are not visible in FIG. 19. Drive motor 2001 is shown engaged to a gear box 2002 with sufficient mechanical reduction to drive drum 1802 with sufficient power at and at rpm appropriate to use in rescue operations. Motor 2001 is powered through cable 2003 from a power supply 2005. Motor 2001 comprises a brake 2004 that may be manually or automatically engaged in certain circumstances to slow the rpm of drum 1802. FIG. 20 further shows a computerized controller 2007, and an antenna 2006 by which the computerized controller may communicate with remote devices enabled to communicate with the controller. Further description of controller 2007 and interaction with other devices is provided in enabling detail below.

Figure 21:
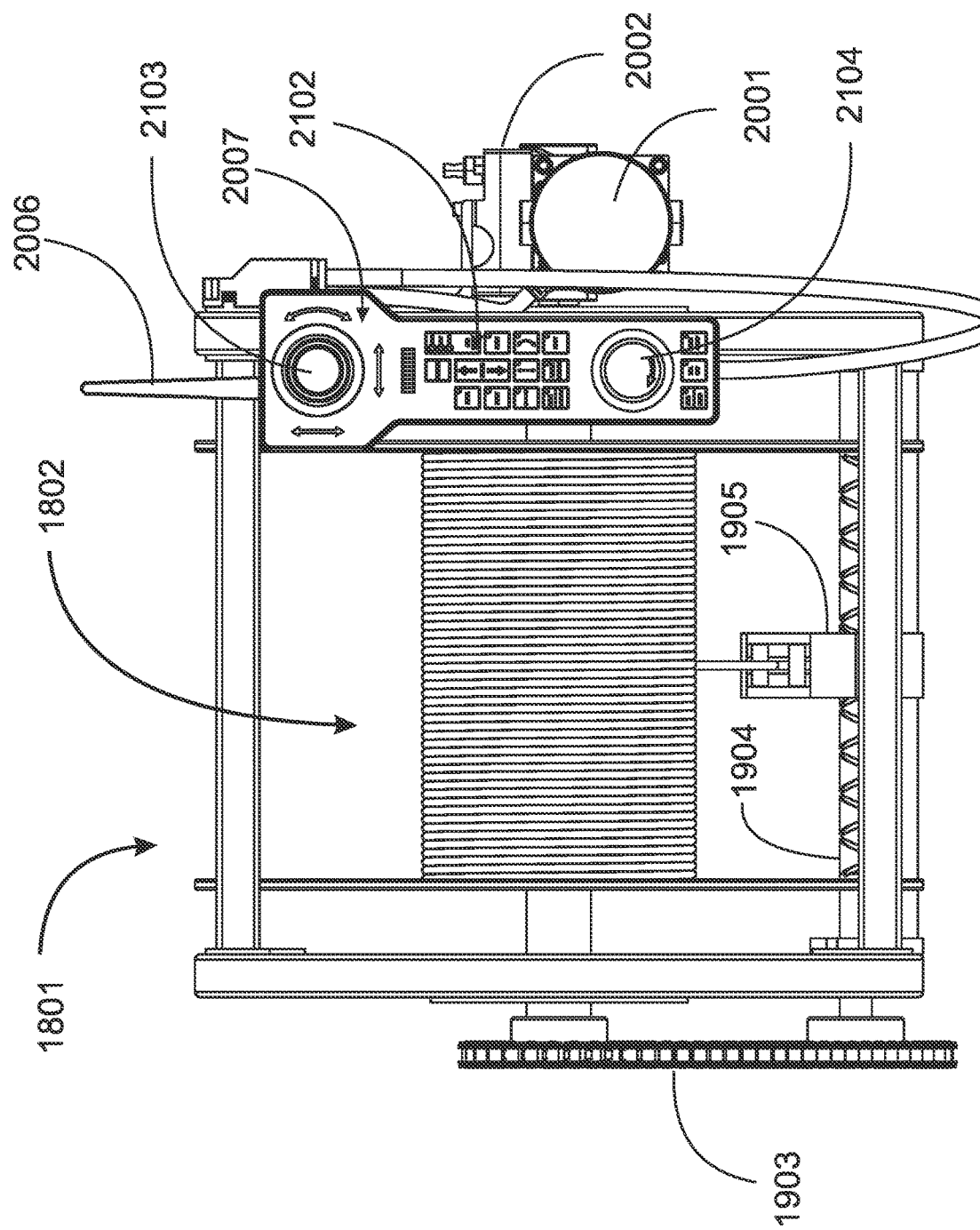
FIG. 21 is a back view of the winch additionally showing a panel on a controller by which the winch may in some circumstances be manually controlled.

FIG. 21 is a back view of winch 1801 additionally showing a panel 2102 on controller 2007 by which winch 1801 may in some circumstances be manually controlled. Panel 2102 comprises a series of buttons and switches are is provided to enable an operator to manually operate the winch control to run functions of the winch. Knob 2103 controls forward-reverse and speed for the winch. In an automatic mode winch 1801 is radio-controlled in a feedback process detailed more fully below. The buttons and switches on the manual-control panel have lights that activate when activated and knob 2103 at the top moves with a servo inside the controller so that if the winch is under remote control the operator standing next to the winch can see things moving and buttons lighting up as if actuated by themselves. This provides the operator situational awareness.

Figure 22:
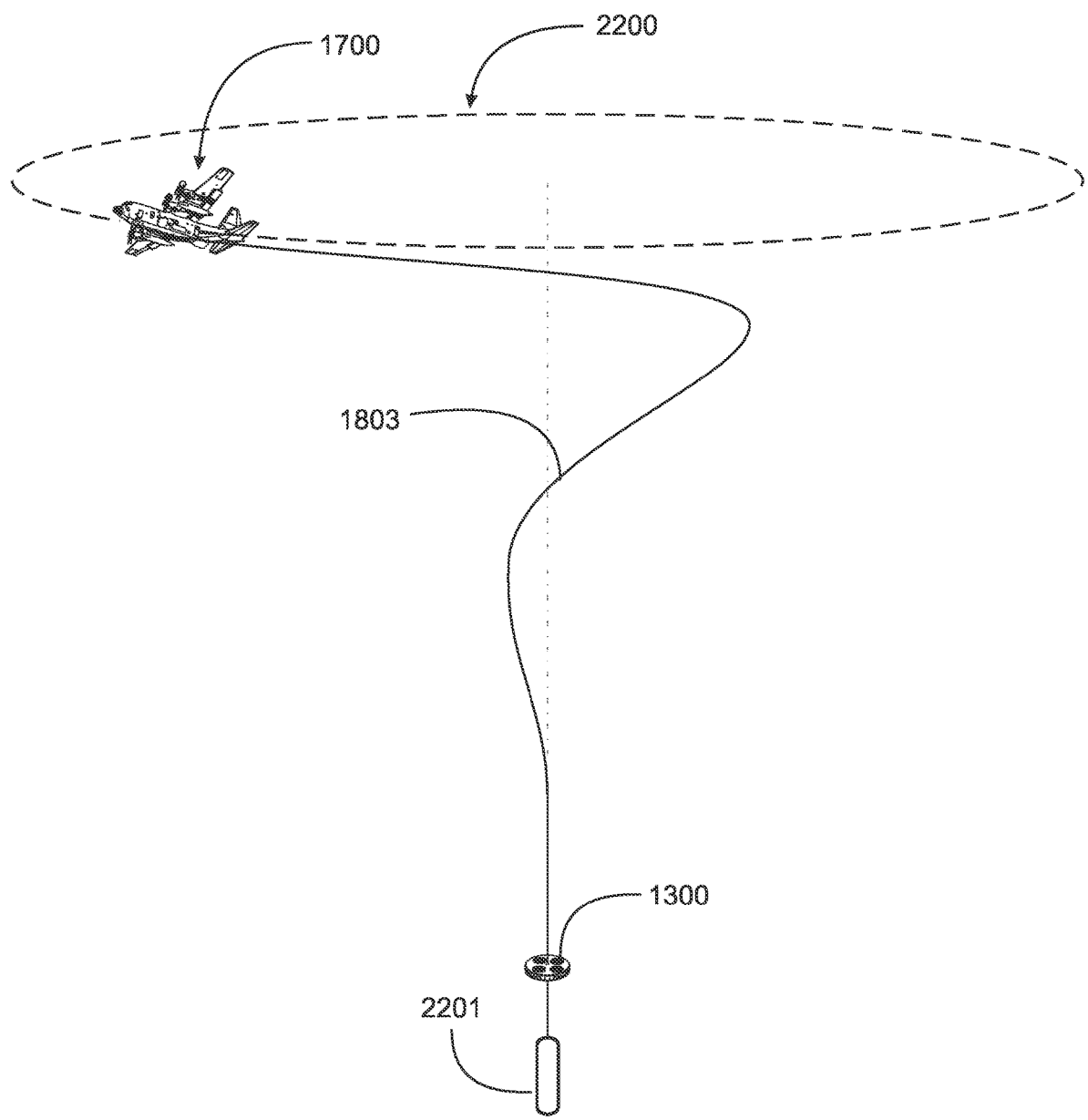
FIG. 22 illustrates a transport aircraft in a predetermined circular orbit with a tether line having been deployed from a winch in the cargo bay of the aircraft in an embodiment of the invention.

FIG. 22 illustrates a transport aircraft 1700 in a predetermined circular orbit 2200 with a tether line 1803 having been deployed from a winch in the cargo bay of the aircraft. The aircraft has adopted a flight path into the circular orbit while the tether line has been fed by the winch, such that a payload shown here as element 2201 is suspended in a gravity well, just as described above, with tether 1803 describing a spiral path.

Payload 2201 in one embodiment may be a harness, sans parachute, for a subject to don to be extracted and retrieved into the cargo bay of aircraft 1700. The harness may be provided in a pod that also may include GPS circuitry and radio circuitry that may be in continuing communication with computerized systems in aircraft 1700, which are in continuing communication with winch 1801, to coordinate operations of the winch and the aircraft to place the payload or pod with harness at a desired point. The delivery point may in some instances be provided to the aircraft systems by the subject on the ground to be extracted, if the subject has the knowledge and equipment to make the communication.

Alternatively, the subject may be spotted by an alternative overhead asset that has a better look at the specific point of interest either by virtue of more capable optics such as would be found in a surveillance platform. This might be remotely controlled on a separate aircraft, such as an unmanned UAV, or a camera or on-board the winch platform. Such a system will survey the area and when it finds the point of interest it transfers an image of that spot to a stabilizer 1300 engaged on the tether, or en route to the target or hovering nearby.

In some cases machine vision may be used. Deployed stabilizers 1303 may be guided by manual positioning or automatically by a homing system. The pod, if used, may be homed using GPS coordinates, Inertial coordinates, laser designation such as used on smart bombs, infrared homing or machine vision homing. In machine-vision homing, there is a camera on-board one of the stabilizers, if more than one are deployed, that looks for a specific image that can be preloaded into the device or transmitted to the camera via another camera in real time.

The image used at the stabilizer may be provided from another source, as described above, that has a better vantage and superior imaging equipment. The better optics system would survey the area and when it finds the point of interest it transfers an image of that point to the stabilizer either en route to the target or hovering nearby.

The process described parallels hand-off of imagery much the same way a radar missile gets a hand-off from the on-board radar of a fighter. The first camera, being of higher resolution, on a stabilized gimbal or having the benefit of human interaction to find a target can take a still picture, send that still to the stabilizer who then uses its on-board pattern matching software to find and then execute an engagement.

As has been noted thus far, all separate assets in the system are in constant communication. The stabilizers deployed, whether engaged to tether line 1803 or not, are in contact with the equipment at the subject, and the computerized system in the transport aircraft, which systems are in constant communication with the winch in the aircraft. Every piece knows what the other pieces are doing, and there is capability of human intervention and fine-tuning to perfect the deployment and the extraction process.

On the ground or at another location there may be a controller identical to that on the winch that operates the winch from the ground. The only way one knows who is in control is by a light in a pendant that will be green if that controller is active and red if it's not active. This is the only indication on either controller (or more than two) that the controller is either passive or active.

As an example, if the person on the ground is operating the winch the controller on the winch indicates a red light but all the other functions are mimicked by the controller. If the ground operator wants to let the tether out the big knob moves downward on every controller connected to the network. A typical operation would have the airborne operator lower the tether until a handoff is initiated and the ground operator assumes control. All the buttons and levers may be preset by the airborne operator so that when the ground controller takes over there are no sudden changes in operation of the winch.

For automatic operation, the stabilizer(s) will communicate with the same controller to operate the winch via radio link. If the stabilizer demands more tether it will signal the winch and more tether will be deployed. The winch is powered by a motor through a transmission that can be declutched. There is also a brake on the motor, as seen in FIG. 20, to prevent the drum from slipping under heavy loads. This brake is automatically engaged whenever the controller demands zero speed. This is done with the motor power supply.

In some embodiments payload 2201 as seen in FIG. 22 may be a capsule that the subject may enter and close for transport to the aircraft. In other embodiment there may be a harness that the subject may put on. There may be additional equipment, such as protective clothing, face guard, gloves, boots and other paraphernalia thought to be needed.

Once a subject is engaged in the apparatus of the invention at the lower end of the tether, maintained at a fixed point in the gravity well, the subject may communicate to the aircraft that all is ready for extraction. At this point the continuing operation is much the same as described above for the embodiments using an attack aircraft, and a harness with a parachute. The aircraft, once all is seen to be ready, rolls out of the circular orbit on any heading seen to be appropriate, and the action of the rollout collapses the gravity well, increasing tension in tether 1803. The subject is lifted gradually from the extraction point, at an increasing velocity, and the winch is operated to bring the subject into the aircraft cargo bay. It is not mandatory that the rollout be into a linear path, as the aircraft may employ other maneuvers that may facilitate the retrieval of the subject as well.

In another aspect of the invention a multi-use extraction and delivery pod is provided which may be used for delivery of cargo to a point on ground surface, which may include water surface, extraction of cargo from the point, delivery of personnel to the point on ground, extraction of personnel, and rescue of a subject who may or may not be injured from the rescue point, among other uses as well.

Figure 23:
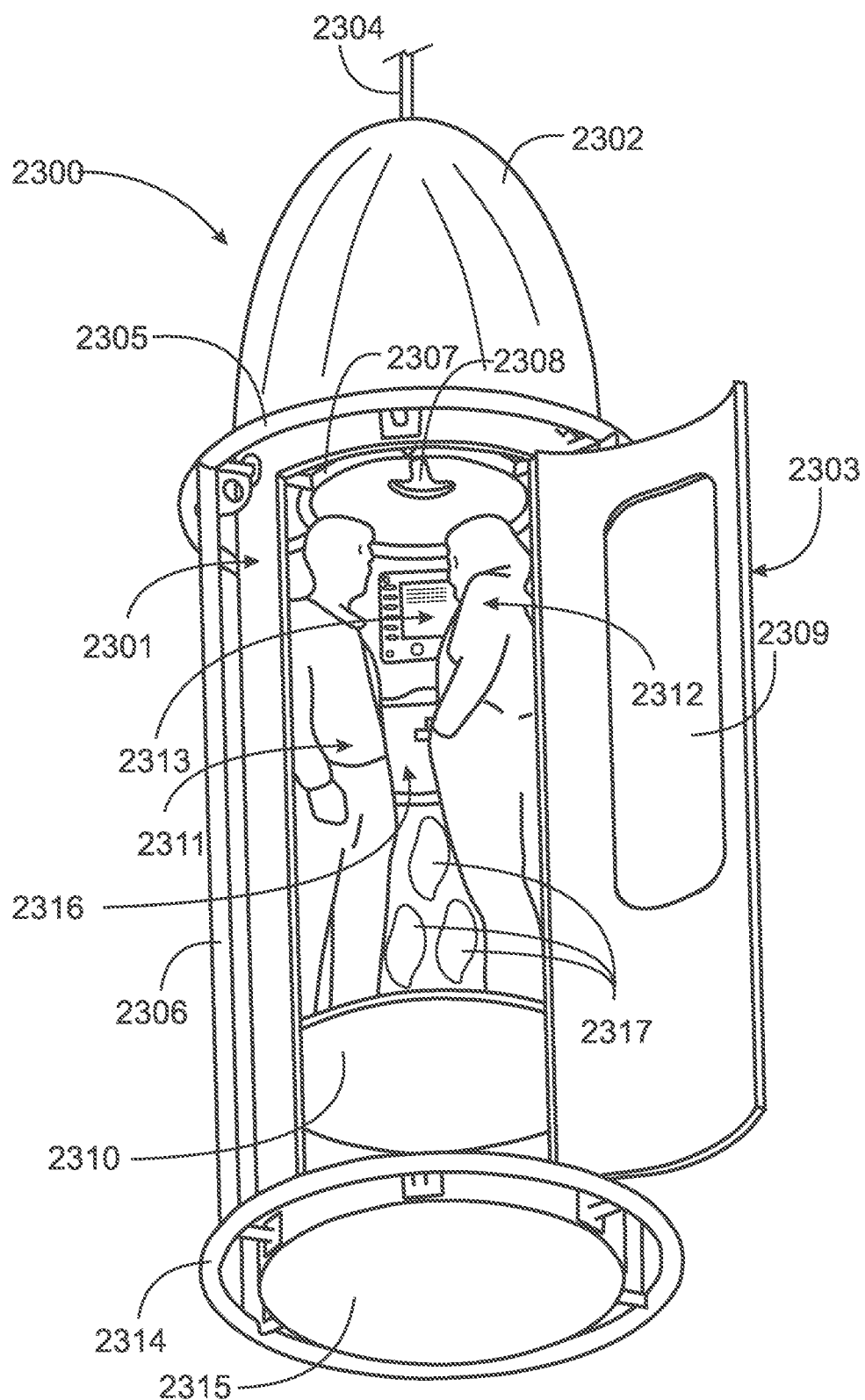
FIG. 23 is an elevation perspective view of an extraction pod in a further embodiment of the present invention.

FIG. 23 is a perspective elevation view of a rescue pod 2300 suspended from a tether 2304 in an embodiment of the invention. Pod 2300 is a pod that serves a number of purposes, a principal purpose of which is to rescue a subject who may or may not be injured or ill. In one embodiment pod 2300 may be eight to twelve feet tall and may be three or more feet in diameter and provides an enclosed compartment for one or more persons.

In some embodiments pod 2300 is used with a medically trained person who may deploy with the pod and aid in rescue of a subject. In other embodiments the medically trained person may not be present, and the rescue subject enters and secures the pod without aid from the other person. In this embodiment, the subject may self-treat and self-medicate using medical equipment delivered in the pod.

In FIG. 23 a rescue subject 2311 is shown inside pod 2300 in this example, along with a medical person 2312. This circumstance occurs after the pod has been lowered from a delivery vehicle to a rescue point, with the medical person 2312 on board. The subject has been brought on board, and the pod may be lifted from the rescue point or remain on ground. Although subject 2311 is shown to be standing in the pod in this illustration, the subject may be injured, ill or both. In one circumstance the subject may be engaged with a harness apparatus, which may have rigid and non-rigid structural elements, straps and Velcro fasteners by which the subject may be supported and managed.

In one circumstance subject 2311 may be engaged to the described harness apparatus at the rescue point outside the pod and raised into the pod by the apparatus. A circular rail 2307, interior to the pod, is shown in an upper reach of pod 2300 and this rail is useful to both the subject and the medical person to hold during movement of the pod but may also be used to suspend the subject upright by attachment between the harness apparatus and ring 2307. Another embodiment may provide the harness attached to an inner surface of the pod. Pod 2300 has an upper dome 2302, which in one embodiment houses a pod main parachute which may be deployable by, for example, a handle 2308 within pod 2300.

An upper circular rail 2305, anchored by brackets to an outer surface of body 2301 is coupled to a plurality of vertical rails 2306 which in turn are coupled to a lower circular rail 2314. These rails provide a system for carrying a plurality of personnel (not shown) who may stand on the lower rail 2314 and grasp vertical rails 2306 or upper circular rail 2305, or both. The pod has a bottom floor 2315. A door 2303, in this embodiment with a window 2309, is hinged to an opening in body 2301, and is an access portal through which cargo, medical persons and rescue subjects may be passed. An internal floor 2310 is implemented at a distance above floor 2315, and provides deceleration in emergency landings, as described in more detail below. A control panel and screen 2313 as a part of a control system is shown inside pod 2300 and is useful by a person inside the pod to communicate with a mother vehicle and control functionality of the pod, itself, as also described in further detail below.

Referring now to FIGS. 17 through 22 deployment and retrieval of pod 2300 in some circumstances is described. FIG. 17 illustrates a transport aircraft 1700 of a sort that may be used to deploy and retrieve the pod in winch-enabled embodiments. Aircraft 1700 in this figure is a C-130 cargo aircraft capable of considerable payload, and certainly sufficient payload to accommodate circumstances surrounding use of a rescue pod 2300.

FIGS. 18 through 22 illustrate equipment useful for deploying and retrieving a payload and accompanying description above describes use of the equipment. FIG. 22 illustrates aircraft 1700 in a circular orbit 2200 with a tether 1803 in a descending spiral in a manner to lower payload 2201 to a point on ground surface and to lift and retrieve the payload from the point. Pod 2300 of FIG. 23 is a payload which may usefully be deployed from an aircraft such as aircraft 1700, and in many embodiments of this invention pod 2300 is carried by aircraft 1700, deployed from a cargo door by a winch, lowered into a descending spiral and delivered to a rescue point. A subject 2311 may be brought into pod 2300 at the rescue point and the pod may be lifted and brought back to the aircraft 1700. Mechanics of the spiral operation are described in enabling detail above.

Although a fixed-wing aircraft equipped as shown for aircraft 1700 may be a preferable vehicle for deployment and retrieval of pod 2300 in embodiments of the invention, other fixed wing aircraft may be used, and in one embodiment pod 2300 may be carried and deployed from a helicopter, using a winch as well.

The size and capacity of pod 2300 in one version is intentionally of a size that two persons, such as a rescue subject 2311 and a second person, in many embodiments a medical technician or other medically trained person, may stand together and still have room that the medical person can monitor and treat the recue subject. In some other embodiments the pod may be smaller in diameter to accommodate just the rescue subject.

In one embodiment the control system of which panel 2313 is a part may comprise medical monitoring devices as well. A blood pressure cuff may be integrated with the control panel, as well as a temperature sensor, an oxygen sensor, and other medical sensors, such as an ultrasound wand and sensor. A medical kit 2316 is provided and accessible to the medical person, or to the rescue subject if no medical person is present, the kit comprising bandages, injection syringes, a variety of needed injection materials, blood plasma, materials for forming casts, surgical instruments, inflatable casts, and the like. Any equipment needed by the subject may be included.

In addition to the medical equipment and sensors the control system provides two-way communication with personnel in plane 1700, one or more of which may be trained medical professionals, and there may be radio equipment and Internet access ability such that the medical person 2312 in pod establish dialogue with medical personnel in institutions far removed from the rescue site. Communication may occur between the subject and other personnel in a proximity enabling such communications and is not limited to personnel in plane 1700. Connection may be made on identification of a rescue subject with medical archives having medical records specific to the rescue subject. The communication afforded through the control system may also be leveraged in deployment and retrieval of pod 2300.

In one use case pod 2300 may be deployed in a situation wherein a subject may be injured in a place inaccessible to ground or helicopter rescue. The circumstances and location may be radioed to any friendly station, which may relay same to a rescue unit including fixed wing aircraft 1700 staffed with medical and military personnel and equipment, including a pod 2300 and winch 1800 and associated equipment in the cargo bay. Aircraft 1700 may be deployed from an airfield facility or may be in flight along with similarly equipped aircraft.

On receipt of the information regarding a needed rescue operation, aircraft 1700 may be vectored to a position at altitude over the recue site, and there implement the circular pattern at an altitude, airspeed and pattern diameter for deployment of pod 2300 in a gravity well. Pod 2300 is deployed from the cargo door of aircraft 1700 with a winch having a substantial length of tether 2304 on a spool. As the tether is fed the pod enters the gravity well pattern and descends. Corrections to aircraft altitude, orbit and airspeed may be made during descent of pod 2300 to place the pod on ground at the rescue site.

In one circumstance military personnel, armed or unarmed, may accompany the pod to the ground point, standing on rail 2314 and holding other rails, and may deploy at the rescue point for any needed action, and may either stay or remount the pod for extraction after a subject is brought on board.

Subject 2311 is triaged by medical person 2312, if deployed and present, and appropriate pre-treatment, binding of wounds, and so on may be done prior to loading the rescue subject to pod 2300, or the subject may be loaded, and the pod may be lifted into a retrieval pattern, and medical procedures performed in flight. In one circumstance, upon retrieval of the rescue subject, pod 2300 may be lifted, and aircraft 1700 may be vectored to a known medical facility, and the aircraft may establish the deployment orbit again, and may lower the pod to a ground point near the medical facility where the rescue subject may be unloaded. The aircraft may then maneuver to lift the pod and embark on a holding pattern or another mission.

In another use case, wherein the medical person is not present, the pod may be tailored for rescue of wounded personnel that may have limited use of their arms and legs to facilitate their rescue. Upon positioning the pod on the ground, the pod positions itself horizontally on the ground with access on the top or side while maintaining sufficient tension on the tether above it to prevent the line from laying on the ground or becoming entangled on the ground. Once on the ground, the pod door's position allows the rescue subject to be able to enter the pod by rolling or pulling themselves into the pod using straps and handgrips along the pod. Voice directions may be provided to the rescue subject either by a person on the host aircraft or through pre-recorded instructions. Lights of various varieties within the capsule may aid in providing rescue subject orientation and seeing printed instructions as well as allowing rescue personnel on host aircraft to monitor progress.

In one embodiment the rescue subject may have limited use of arms and legs and may be restrained through use of a series of inflating airbags around the inner sides of the rescue pod, shown in FIG. 23 as air bags 2317. The air bags allow for safe automated restraint for the rescue subject. The airbags also provide padding to protect the occupant as well as insulation from cold exterior air and winds while in transit. The air bags may be adjusted to movement when needed and to allow adjusting pending wounds of the rescue subject. The bags may be inflated to treat for stress, apply pressure to bleeding wounds, or relief pressure from other injuries, or regulate pod air pressure. The air temperature within the airbags may be adjusted to provide heat as insulation and treat for stress and shock. Sensors on the airbags may monitor the rescue subject's temperature, breathing rate, pulse and movement. The airbags may be positioned at different places manually and may be inflated or deflated as needed by either the rescue subject or the medical person.

For maritime/water rescue, the pod orients itself vertically at the surface of the water with the doors positioned at the water line, to allow a swimming rescue subject to enter the pod while keeping their head above the water line. Once within the pod, the doors can close and the airbags may inflate around the mid-section to help restrain the occupant before further inflating in other areas to help displace water from within the pod through holes at the bottom of the pod and aid in lifting the pod higher in the water and lightening the weight of the pod before retrieval.

In another use case, the pod may be separated from the tether and left with the rescue subject(s) for use as a shelter. The pod contains its own communications capability and supplies to include survival equipment tailored by the user prior to deployment to the host aircraft. In maritime/water situations, the air bags can aid in lowering or raising the pod and altering its position from vertical to horizontal to keep the occupant out of the water. Lights/strobes on the pod can aid in nighttime detection. These different features can be controlled by the rescue subject to aid in rescue and to conserve electrical power when needed.

In another use case the aircraft and pod may be used for cargo delivery. Cargo needed at some location may be loaded to the aircraft at an airport, the aircraft carrying the pod and deployment and retrieval equipment. The aircraft may take off, establish its orbit over the location where the cargo is wanted, and deploy and lower the pod to a ground point, where personnel on the ground may unload the cargo. The pod may then be lifted, in which one or both of personnel and alternate cargo may be loaded, and then delivered to another point or brought back to the airport, or an alternate airport.

In various use cases the ability of the pod to carry cargo may be leveraged for the particular nature of a mission. For example, in a water rescue mission it may be standard to include a number of life vests and life preservers, swimming gear like swim fins and the like. In other missions oxygen masks and bottled oxygen may be provided. The presence of medical equipment and first aid materials has been mentioned elsewhere in this description.

Figure 24:
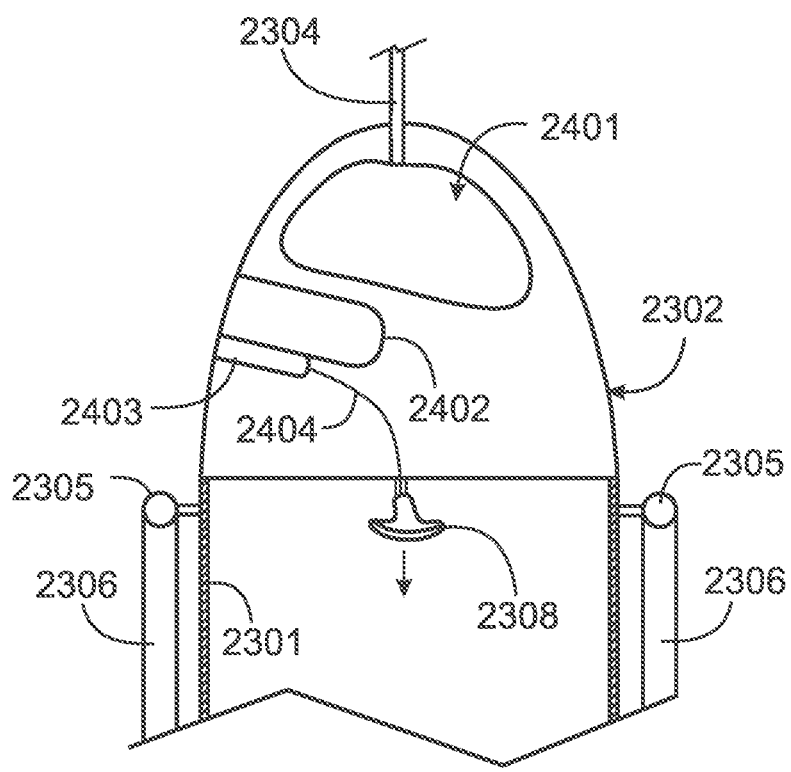
FIG. 24 is a partially cutaway view of a dome of the pod of FIG. 23 in one embodiment of the invention.

FIG. 24 is a partially cutaway view of dome 2302 in one embodiment of the invention. Dome 2302 houses a main parachute 2401 which may be deployed, automatically, via altitude sensor, at need by a person in the pod through the control interface, or in some circumstances may be deployed from the aircraft through communication to the pod control. In operation, main parachute 2401, when deployed, has a tether (not shown) separate from tether 2304. On deployment, a portion of dome 2302 opens enough to deploy the main parachute, and the action of opening the dome to deploy the main parachute disconnects tether 2304 from the pod 2300. The separate tether from the parachute is anchored to the pod by connections in the dome below the location of the main parachute.

Should the main parachute fail, an emergency parachute 2402 is provided, which may be deployed via a connected cable 2404, manually by pulling T-handle 2308 in an upper region of the pod connected to cable 2404. Pulling the T-Handle, which may require a twist as well as a pull, to avoid accidental deployment, activates a charge 2403 that provides gas thrust to deploy the parachute outward from the dome. In some use cases a rescue subject may be delivered to a ground location by deploying the main parachute and disconnecting the main tether.

Figure 25:
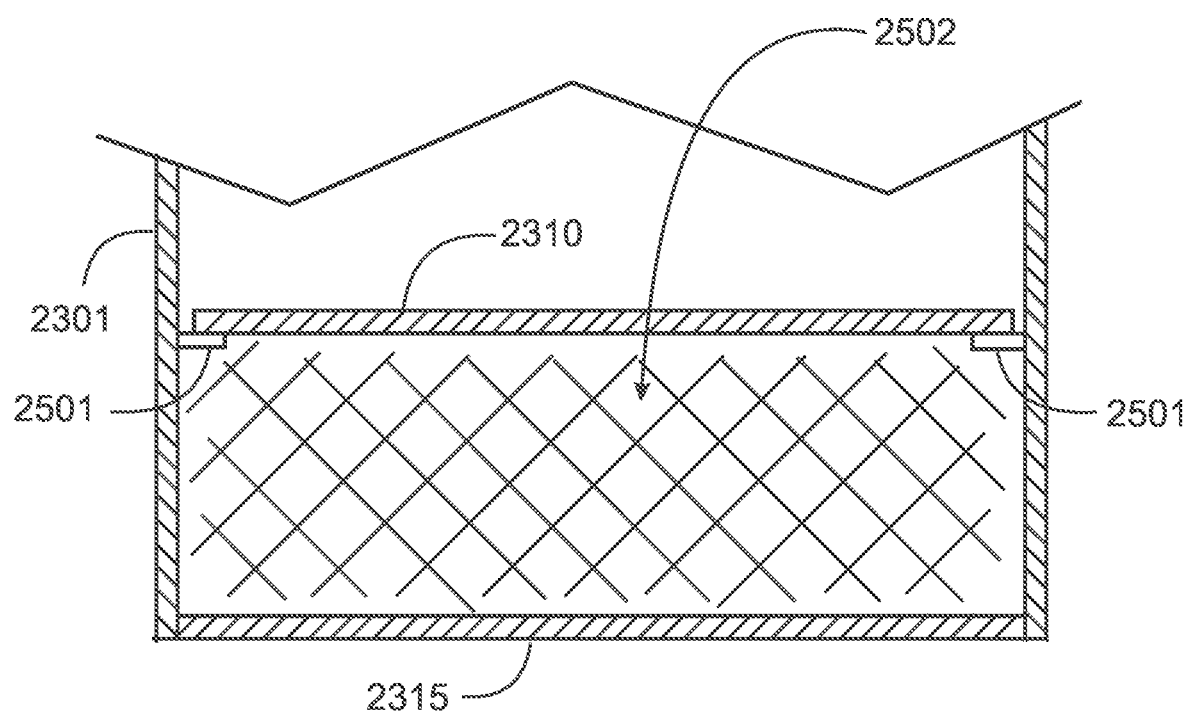
FIG. 25 is a section elevation view of a lower portion of the pod of FIG. 23.

FIG. 25 is a section elevation view of a lower portion of the pod of FIG. 23, illustrating a mechanism for deceleration in an emergency, high velocity landing. As seen in FIG. 23, the floor of the pod upon which occupants stand is floor 2310, which is implemented at a distance above the lowermost floor 2315. Floor 2310 is in one embodiment supported by shearable pins 2501, and space between floors 2310 and 2515 is filled with a crushable material 2502, which may be foam, an air bladder or some other form of crushable material. In a high velocity landing, such as from the main parachute, which may otherwise be unavoidable, the pins shear and floor 2510, supporting weight of occupants moves downward crushing the material 2502. Resistance of floor 2310 will vary according to distance moved as material is crushed, causing a hopefully manageable deceleration for the occupants. In alternative embodiments, the deceleration mechanism may be pneumatic or hydraulic cylinders, and valving to the cylinders may be provided to adjust the rate of deceleration. In other embodiments, the material may be corrugated metals rated to crush at various impact velocities.

Figure 26:
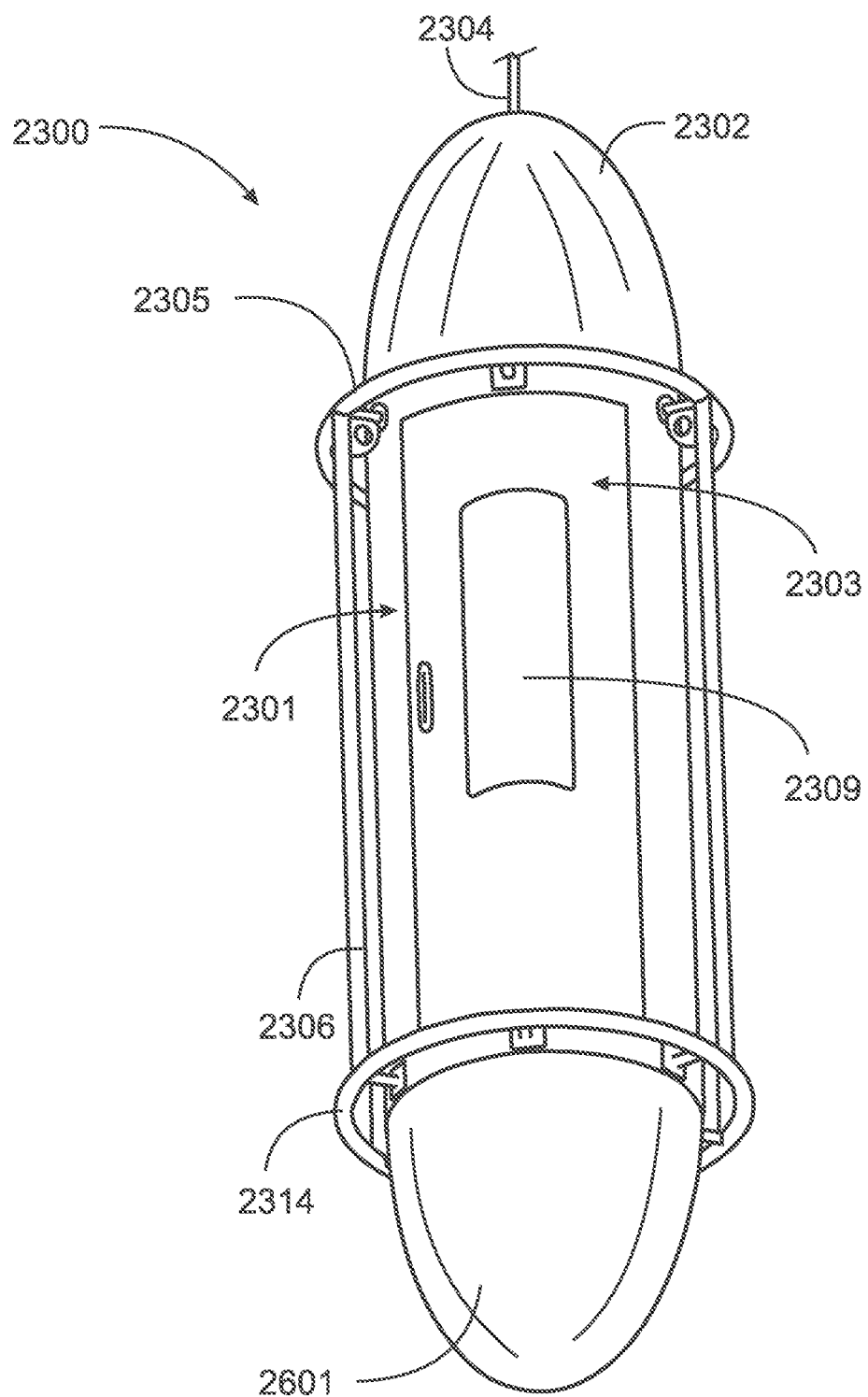
FIG. 26 is an elevation view of the pod of FIG. 23 with door closed, illustrating a balloon in an embodiment of the invention.

FIG. 26 is an elevation view of pod 2300 with door 2303 closed, illustrating a balloon 2601 implemented on an underside of the pod. Balloon 2601 in one embodiment is a gas or fluid-filled balloon having, when pressurized, a dome shape similar to dome 2302. Balloon 2601 may be pressurized and expanded in flight, and as not expanded, may be carried in a flat pouch under the pod, the pouch attached to the underside of floor 2315 (see FIG. 23).

Balloon 2601 is useful for deceleration in a hard landing. If the fluid in the balloon is gaseous, then as the pod encounters ground surface the outer material of the balloon will deform and the gas in the balloon will increase in pressure. The effect is to decelerate the pod over a longer dimension than would happen just striking the ground surface without the balloon. If the fluid is liquid the shell of the balloon will still deform, providing deceleration over a longer period than would be the case striking the ground surface without the balloon. In one embodiment the upper movable floor with shear pins and crushable material under the upper floor may be implemented along with the balloon. In another embodiment only one is present.

It is believed to be important that pod 2300 maintain stable position and movement as the pod may carry personnel outside the pod as described above, and may have an injured subject inside the pod. In one or more embodiments grid fins may be employed to counter spin and other movement of the pod. Grid fins (or lattice fins) are a type of flight control surface often used on missiles and bombs in place of more conventional control surfaces, such as planar fins.

Conventional planar control fins are shaped like miniature wings. By contrast, grid fins are a lattice of smaller aerodynamic surfaces arranged within a box Grid fins can be folded against a body of a missile or a pod more easily than planar fins, allowing for compact storage Grid fins have a much shorter "chord" (the distance between leading and trailing edge of the surface) than planar fins, as they are effectively a group of short fins mounted parallel to one another. The reduced chord reduces amount of torque exerted by high-speed airflow, allowing for use of smaller fin actuators, and a smaller tail assembly overall. In one embodiment grid fins are coupled to the pod and are deployable through I/O signals through control interface 2313.

Figure 27A:
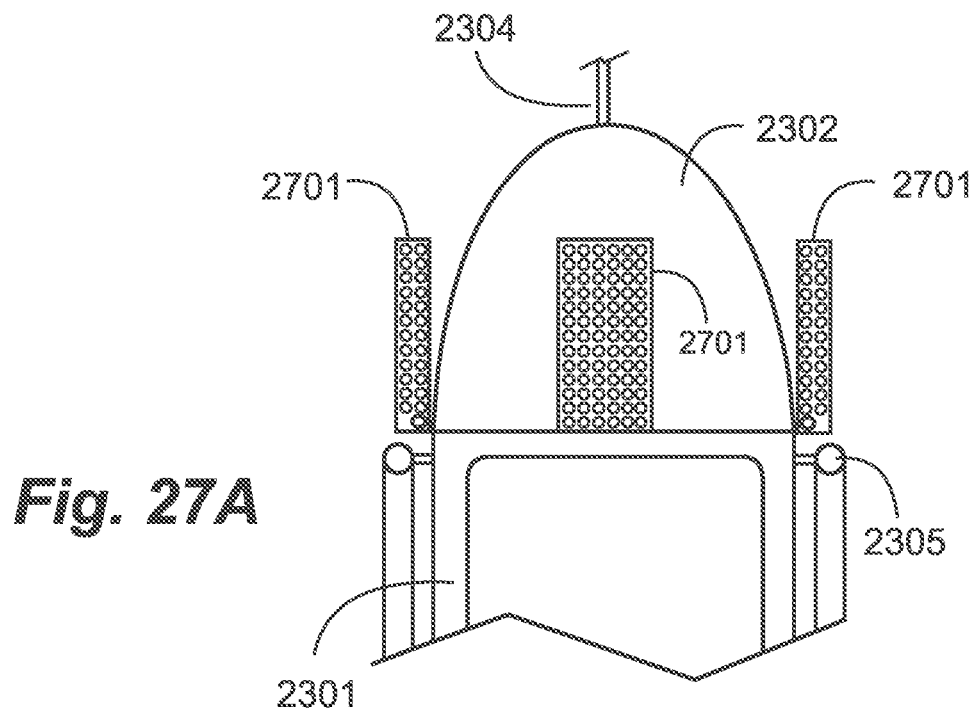
FIG. 27A illustrates an upper portion of the pod of FIG. 23 with grid fins 2701 implemented.
Figure 27B:
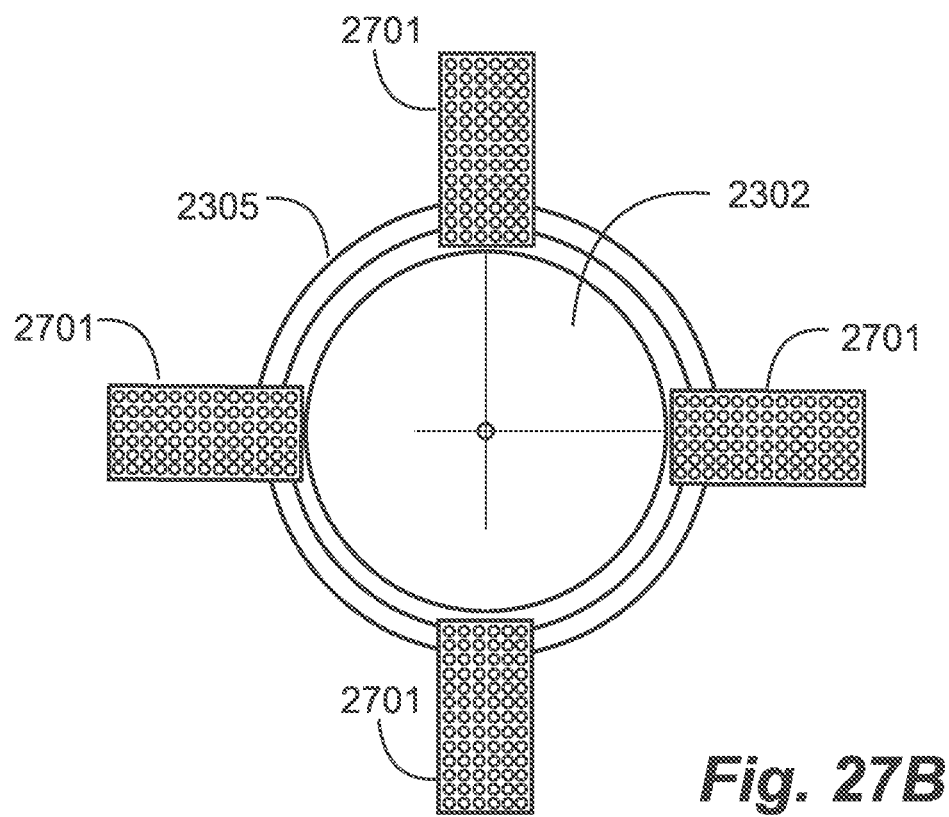
FIG. 27B illustrates a top view showing the grid fins of FIG. 27A deployed.

FIG. 27A illustrates an upper portion of pod 2300 with grid fins 2701 implemented around the dome 2302. In FIG. 23A the grid fins are retracted, folded back against dome 2302. Mechanisms for deploying the grid fins are not shown. FIG. 27B is a top view showing grid fins 2701 deployed.

Figure 28A:
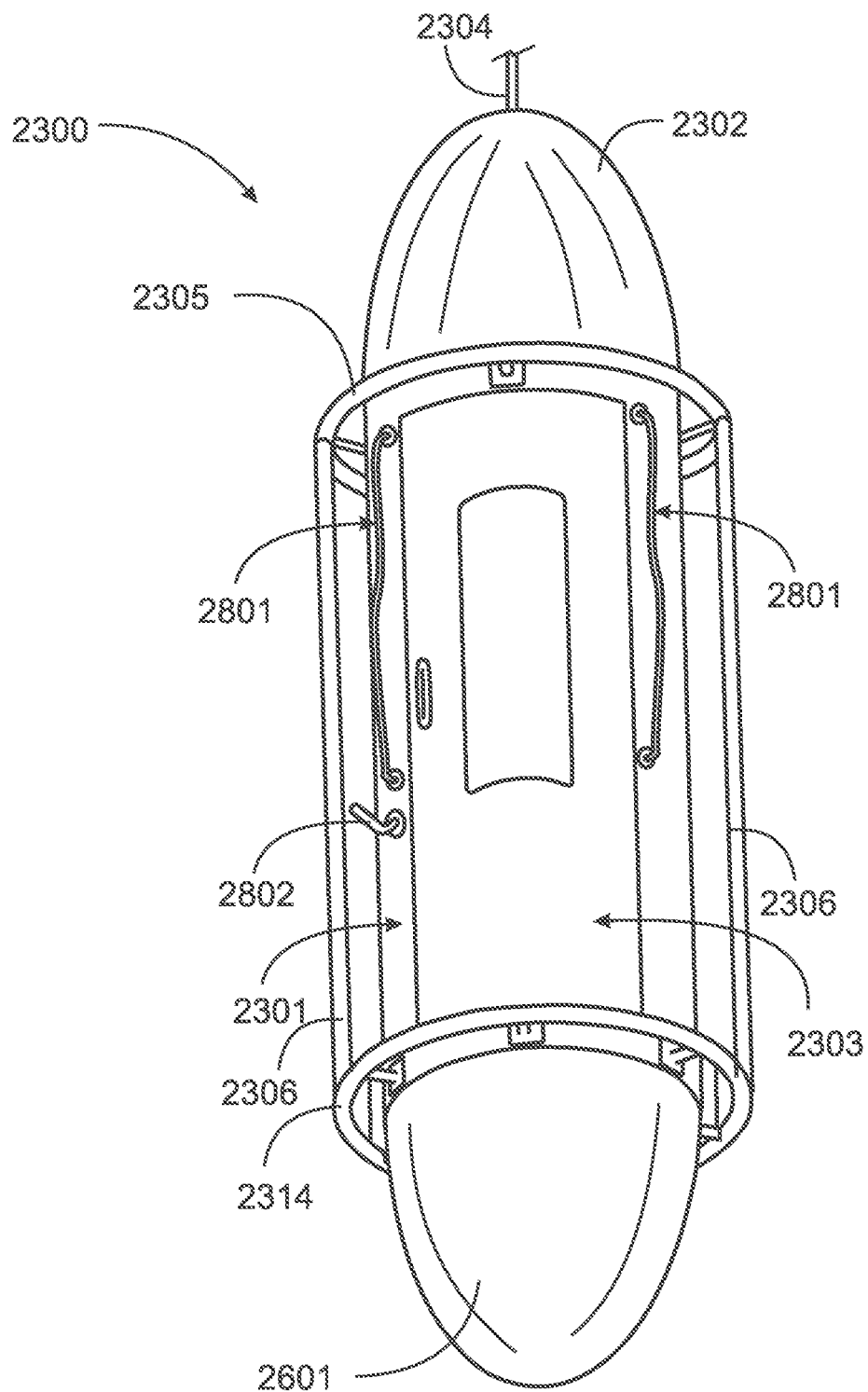
FIG. 28A is an elevation view of the pod of FIG. 23 with a flotation collar.
Figure 28B:
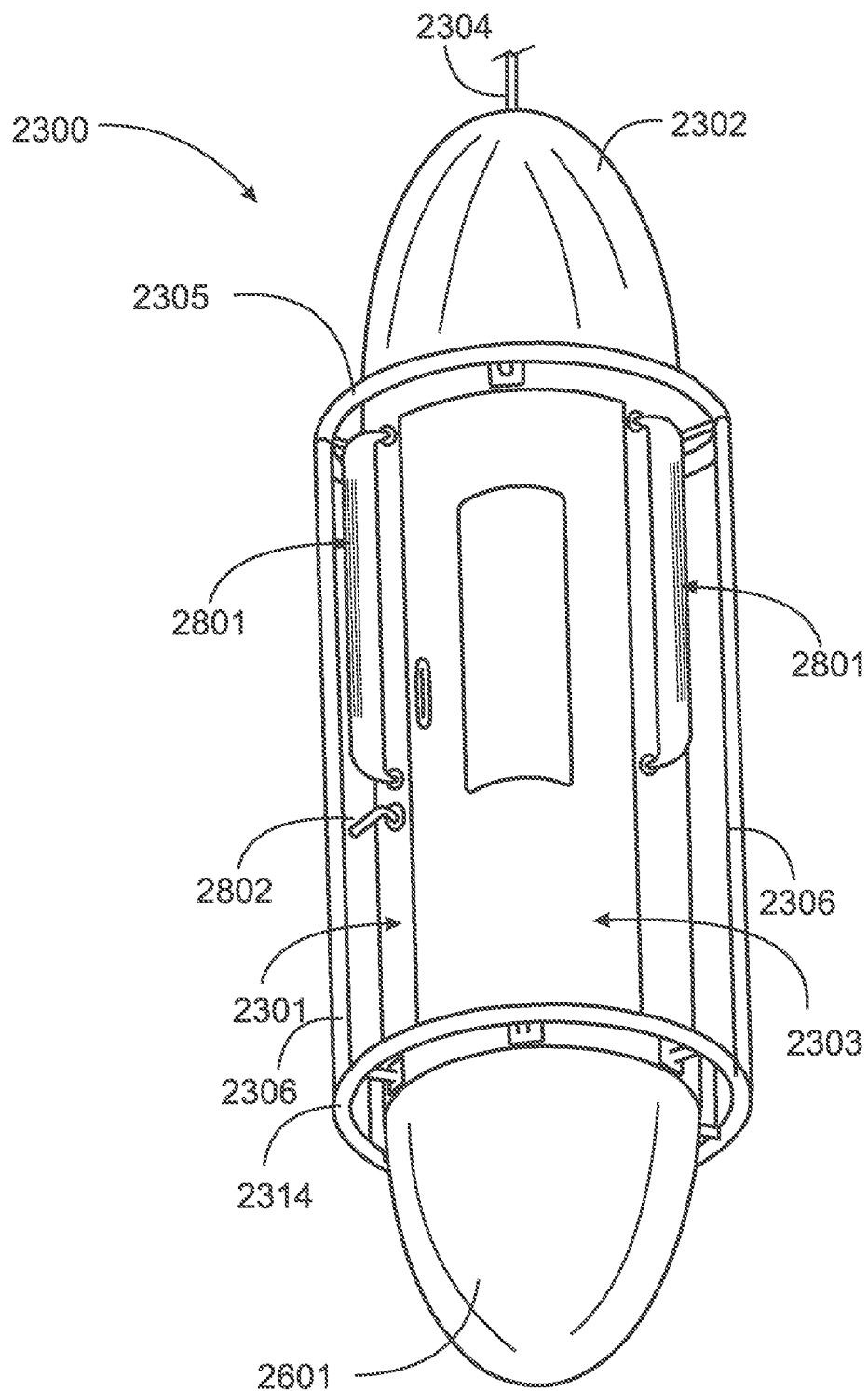
FIG. 28B is a top view illustrating the flotation collar of FIG. 28A.

FIG. 28A is an elevation view of the pod of FIG. 23 with flotation apparatus 2801 implemented on each side of door 2303. Apparatus 2801 on each side of the door comprises an inflatable element that in FIG. 28A is deflated. An operating handle 2802 may be implemented on the body of the pod for a rescue subject to turn to inflate the flotation apparatus. FIG. 28B illustrates the pod with the flotation apparatus inflated. It may be seen in FIG. 28B that handle 2802 has been rotated, which triggers a mechanism to inflate the inflatable elements of apparatus 2801.

The amount of inflation and size of inflated apparatus 2801 is variable depending upon the size, and in some cases, the position in water of pod 2300. Therefore, the relative size of 2801 may be considerably larger than that shown in FIG. 28B.

Pod 2300 has positive buoyancy and may be expected to float in a water rescue in an attitude substantially parallel with water surface. Apparatus 2801, by size and position, ensures that the pod floats with door 2303 facing upward. In one use case pod 2300 is lowered to a location where a rescue subject may be in the water. The rescue subject, or in some circumstances a medical person in the pod as it is lowered, triggers the mechanism to inflate the flotation apparatus. The rescue subject may then open the door with latch handle 2803, or the door may be opened by a medical person inside the pod, and the rescue subject either climbs in and closed the door or is helped in and the door is closed. Procedure than proceeds as in a land rescue. There may be drain passages around a lower extremity of the pod that may be opened at need to drain water that may enter the pod in a water rescue.

In the particular circumstance of a land rescue mission there may be a need to ensure that pod 2300 remains upright at the ground location. In one embodiment, to provide this ability, pod 2300 may be equipped with deployable tripod landing gear, as is done with pods like, for example, lunar modules.

Figure 29A:
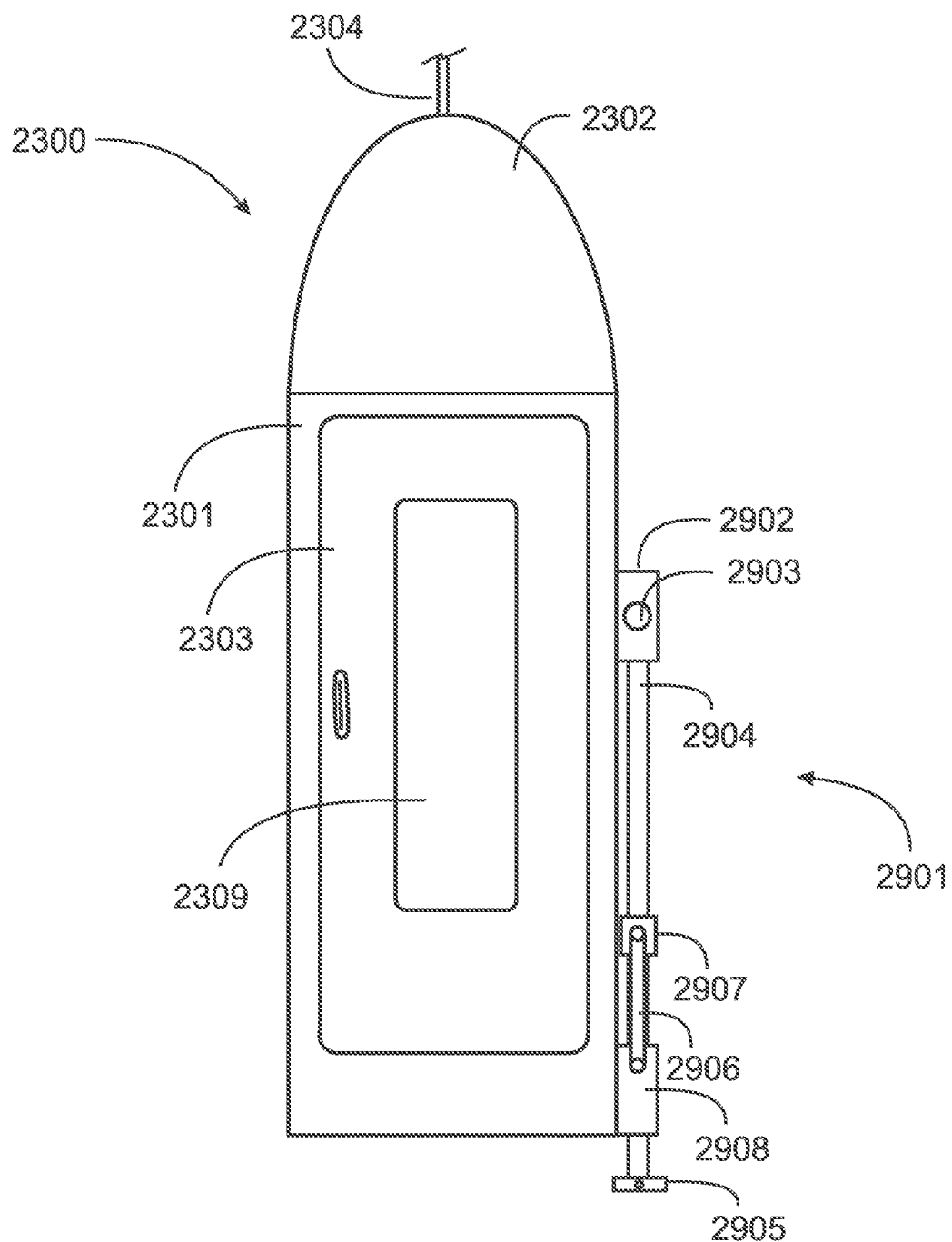
FIG. 29A illustrates a tripod apparatus, retracted.
Figure 29B:
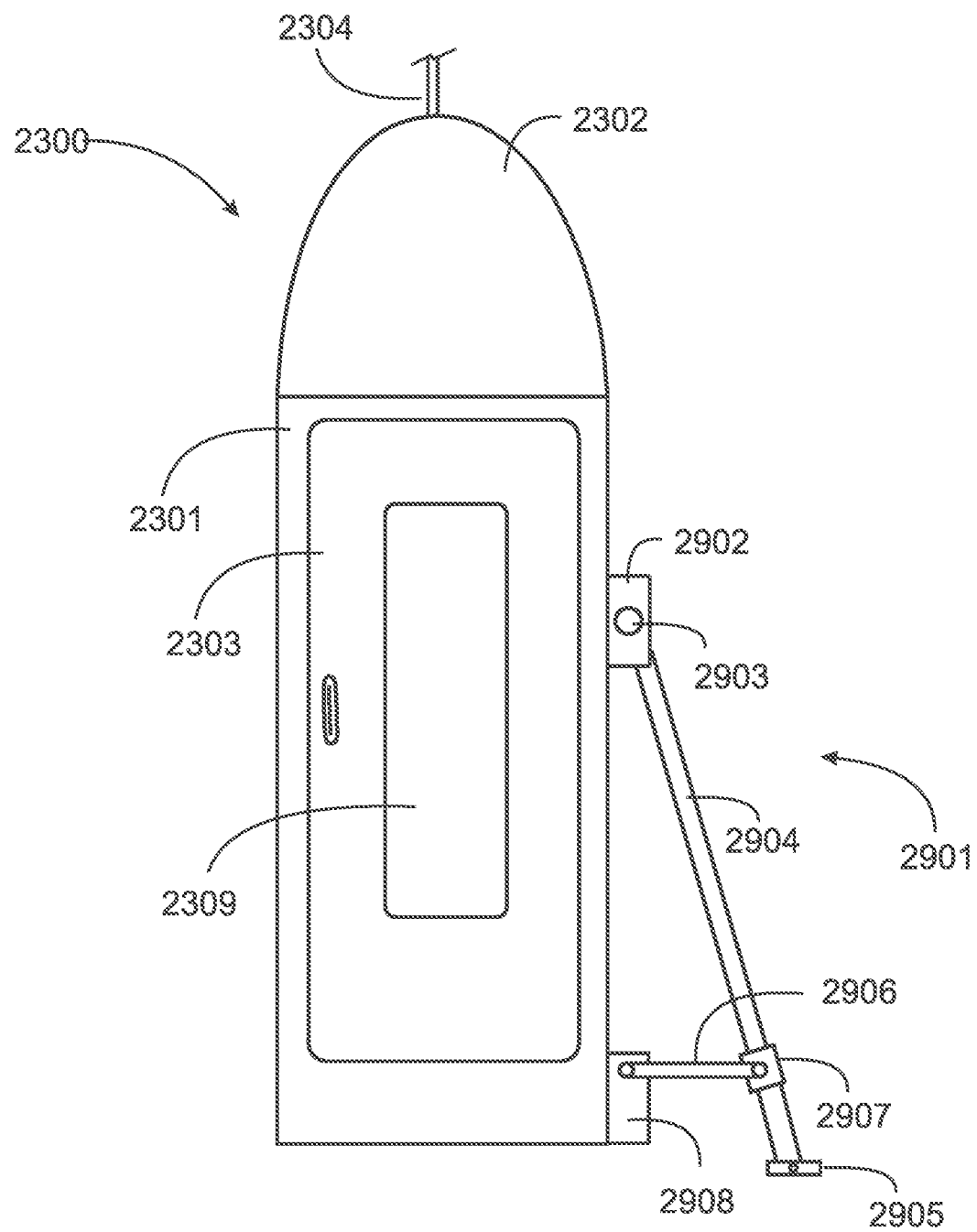
FIG. 29B illustrates the tripod apparatus of FIG. 29A deployed.

FIG. 29A is an elevation view of pod 2300 equipped with a deployable tripod apparatus 2901 in a retracted position. Apparatus 2901 is a single leg of a tripod system having three legs. Only one is shown as sufficient to enable the apparatus, and three or more may be implemented on a pod, equidistantly spaced between each other or placed in positions to adequately support pod 2300 in an upright position. A leg 2904 is pivoted at 2903 in a bracket 2902 such that the leg may be positioned against a side of the pod, as shown in FIG. 29A, or may be deployed swing out away from the side of the pod as shown in FIG. 29B. In this example leg 2904 has a pivoting foot 2905.

In retracted position leg 2904 is constrained in a bracket 2908. A link 2906 pivots on an outside surface of bracket 2908, and pivots on an opposite end on a sliding collar 2907 engaging leg 2904. Ready to land, a powered mechanism controlled by a person in the pod through the control system deploys the legs (of which just one is shown). As the leg pivots outward collar 2907 slides down the leg until level, as shown in FIG. 29B. At that point the mechanism locks the link. The leg is retracted in reverse order of the steps described above. The deployed legs in a tripod provide a broader and more stable base for the pod.

The inventor is aware that use of the apparatus and methods of the invention in rescue missions may often take place in adversarial combat conditions, and there may antagonistic forces desiring to destroy the pod or associated apparatus and personnel. In such circumstances countermeasures are provided for the pod 2300. There may be apparatus in dome 2302, for example for emitting chaff or flares to deter incoming missile guidance. There may be lights on an outer surface of the pod that may be powered in blinking patterns that also may deter guidance-based munitions. Pods may also be camouflaged to blend in with terrain. In one embodiment ordinance may be provided for defense, and weapons may be available for personnel carried on the pod or in the pod 2300. In some circumstances release of chaff and flares, and other countermeasures, may be automatic, that is, by sensing incoming missiles or ordinance. In another circumstance initiation of countermeasures may be done by personnel on board by input through the control system in the pod.

In one embodiment pods may also be armored to an extent to resist at least small arms fire. The armor layer may be Kevlar, polyethylene or Ceramics. Minimum body armor level protection is Level II may be level IIIA or better for most military use cases. The body armor also protects the pod in circumstances that might otherwise damage the pod like being pulled through trees or brush. The window in the door may be ballistic glass.

Figure 30A:
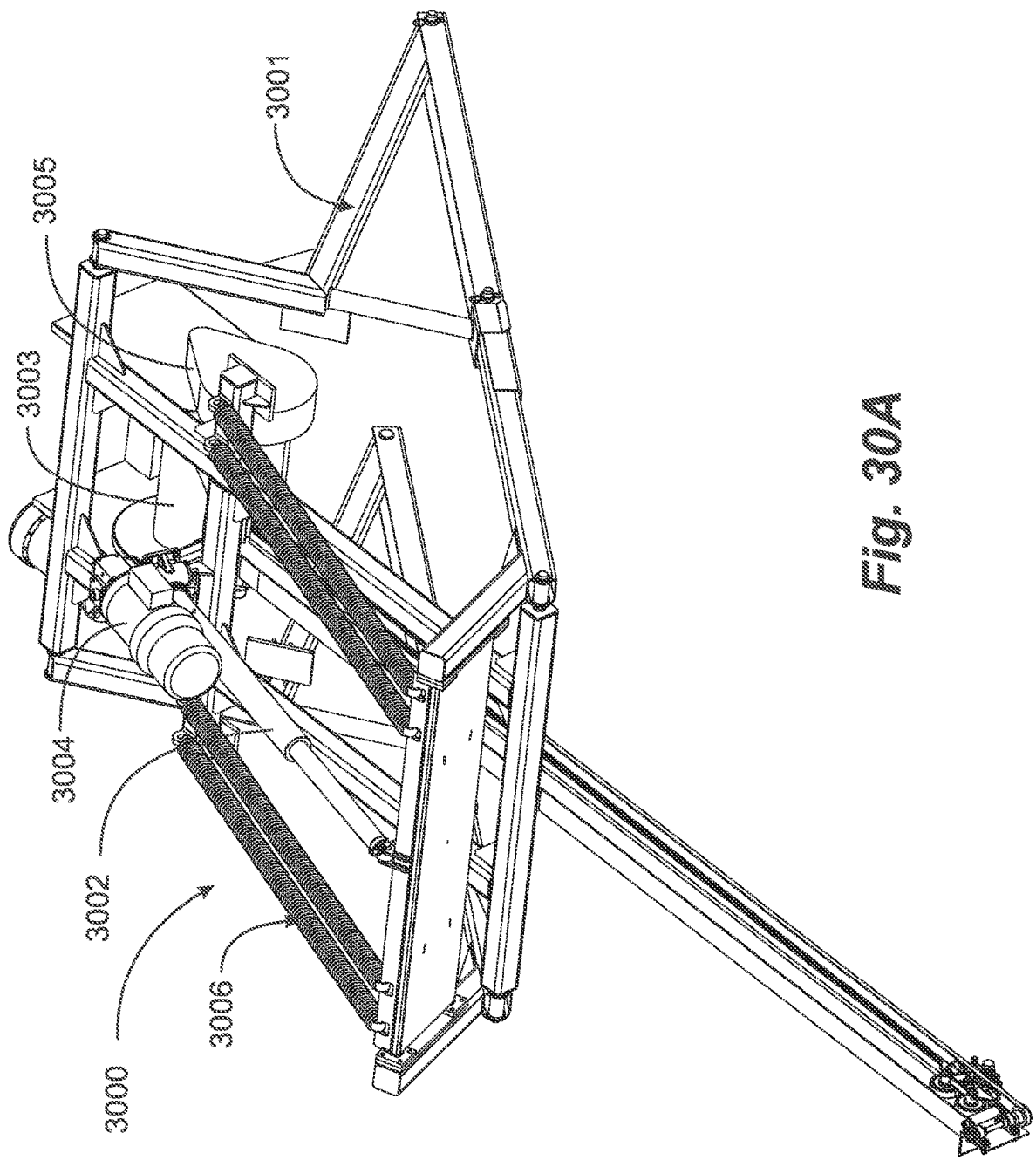
FIG. 30A is a perspective view of an articulated crane in a lowered aspect in one embodiment.

In one embodiment a crane with an articulated frame and a boom is implemented in the fixed wing aircraft as an aid in deploying and retrieving pod 2300. FIG. 30A is a perspective view of crane 3000 shown in a lowered aspect such that boom 3007 is extended at a down angle. With crane 3000 established in the cargo bay of the aircraft, at or near the edge of the door, boom 3007 will extend out the door opening and downward below the cargo bay floor.

In this example crane 300 has an articulated frame 3001 which is jointed and operated with an hydraulic cylinder 3002. Forces necessary to lower and raise the boom or mitigated by counterweights 3005 and tension springs 3006. Spool 3003 is for tether 2304 that is used to lower and raise pod 2300 in rescue operations. The spool is driven by an electric motor 3004.

Figure 30B:
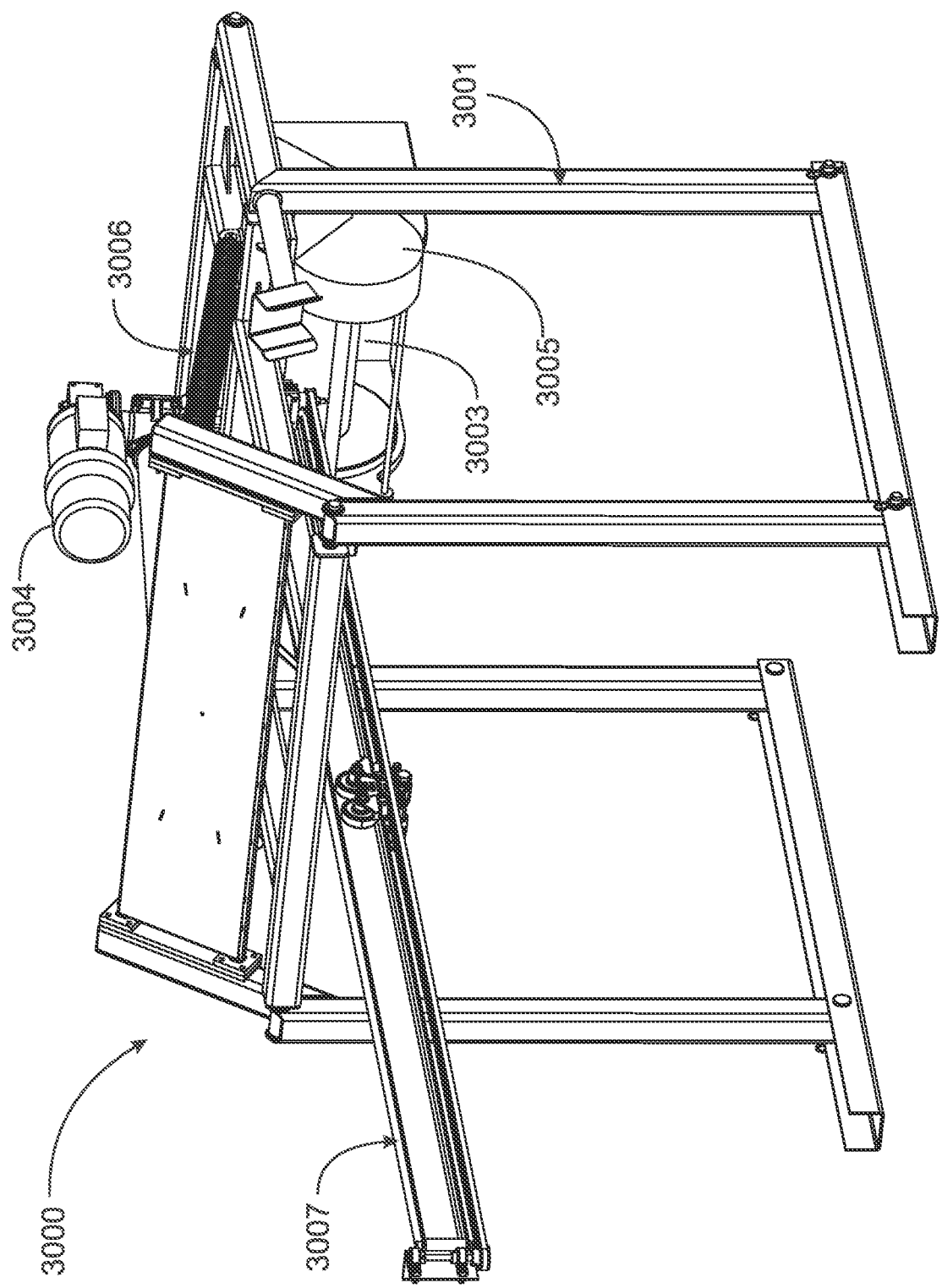
FIG. 30B is a perspective view of the articulated crane of FIG. 30A in an upright aspect in one embodiment.

FIG. 30B is a perspective view of crane 3000 raised to an upright aspect in the cargo bay of the aircraft. Boom 3007 in the upright aspect is now directed horizontally out the cargo bay door.

Figure 31:
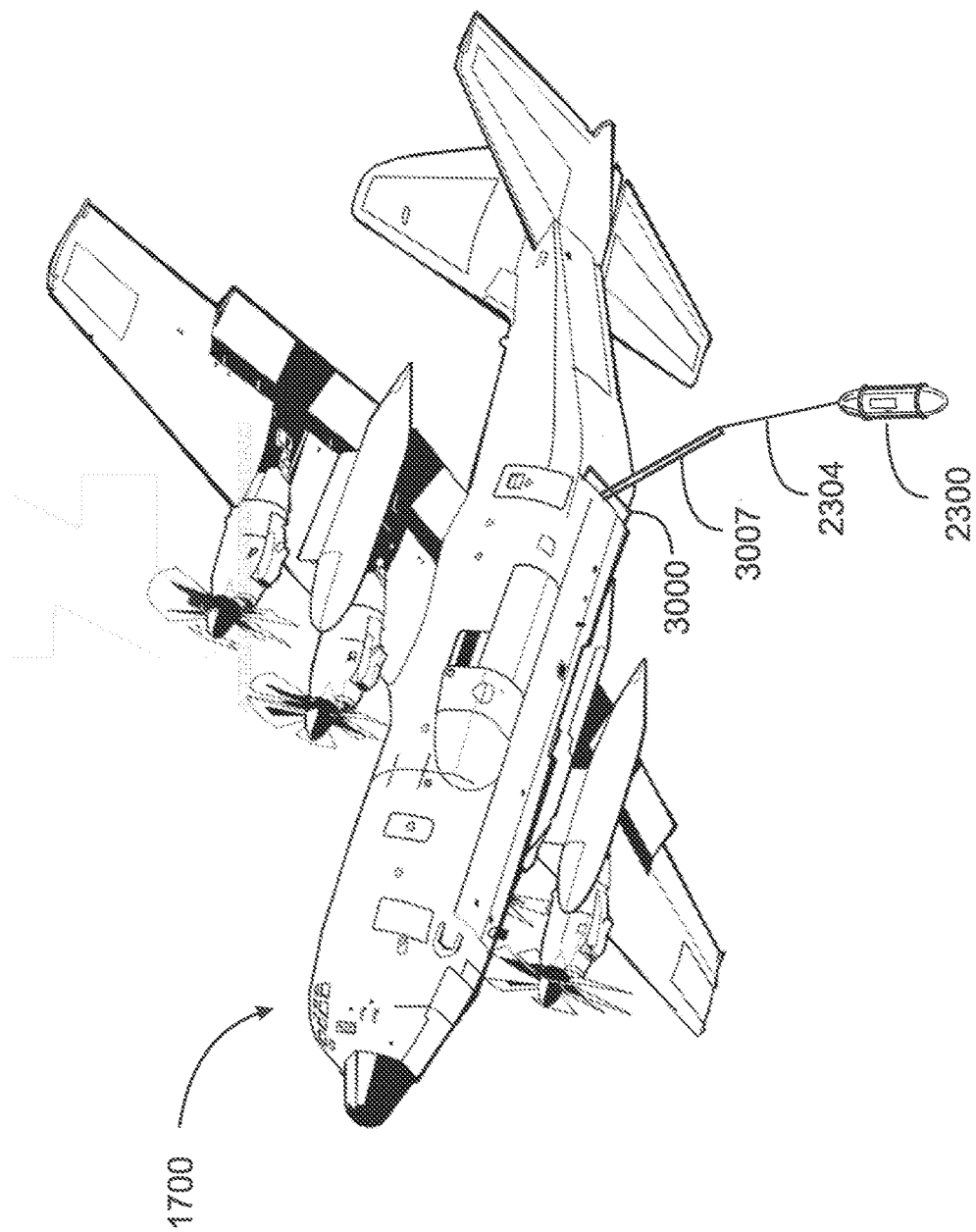
FIG. 31 is a perspective view of an aircraft trailing the pod.

FIG. 31 is an illustration of aircraft 1700 in flight with the cargo bay door open, the articulated crane in the lowered aspect with boom 3007 directed downward with tether 2304 carrying pod 2300. In operation, with pod 2300 on board the aircraft the pod is attached to tether 2304 with the crane in the upright aspect. The crane is lowered to the lower aspect to present the pod through the cargo bay door opening to a position below the cargo bay door. Tether 2304 is controllably released to lower the pod as the aircraft flies in the orbit to lower the bod in the gravity spiral. The steps in this procedure are reversed to bring the pod on board after a rescue with a rescue subject on board.

In some embodiments the aircraft from which the pod is deployed may be an unmanned arial vehicle (UAV). In these embodiments the UAV may be under control of personnel in the pod, and the pilot in the pod may control the UAV, and hence the manipulation of the pod as well pod as well. In one circumstance the UAV may fail for any of several reasons, and the pilot in control in the pod may release the tether and deploy the main parachute, if the pod is in the air at a sufficient altitude. In one instance this may be done through manipulation of T-handle 2308, as further described above.

The skilled person will realize that the situations and embodiments described above are entirely exemplary, and that the functionality may be provided in other similar ways. The apparatus described by be different in many ways but may fall under the breadth of the concepts of the invention. The invention is limited only by the breadth of the claims that follow.

The invention claimed is:

1. A method for extracting a rescue subject from a surface position, comprising:
   lowering a rescue pod having an enclosed compartment with a door from an aircraft, the rescue pod having a main parachute and a control system with wireless communication circuitry, the rescue pod connected by a tether to apparatus with a winch in the aircraft;

controllably releasing the tether from the winch in the aircraft while maneuvering the aircraft into a circular orbit at a specific altitude, diameter and airspeed, creating a gravity well in which the tether describes a descending spiral configuration with the rescue pod descending along a vertical centerline of the circular orbit;

lowering the rescue pod to the surface position;

loading the rescue subject into the enclosed compartment; and lifting the rescue pod from the surface position by retrieving the tether with the winch or altering the path and speed of the aircraft, or both, to gradually increase tension in the tether lifting the rescue pod from the surface position.

2. The method of claim 1 further comprising bringing the rescue pod back to and into the aircraft and unloading the rescue subject into the aircraft.

3. The method of claim 1 further comprising carrying the rescue pod to a point over a predetermined second surface position, reestablishing the gravity well, lowering the rescue pod to the second surface position, and unloading the rescue subject.

4. The method of claim further comprising carrying the rescue pod to a point over a predetermined second surface position, releasing the rescue pod from the tether, deploying the main parachute to deliver the rescue pod down to a point proximate the second surface position, and unloading the rescue subject.

5. The method of claim 1 wherein the surface position is water and the rescue pod comprises inflatable flotation apparatus, comprising delivering the rescue pod to the surface position, inflating the flotation apparatus causing the rescue pod to float with the door facing upward, and loading the rescue subject from the water into the enclosed compartment through the door.

6. The method of claim 1 wherein the enclosed compartment is of a sufficient width to accommodate a second person in addition to the rescue subject, comprising lowering the rescue pod to the surface position with a medically trained rescue person in the compartment from the aircraft, loading the rescue subject, and treating the rescue subject by the medically trained person.

7. The method of claim 6 wherein the aircraft is an unmanned arial vehicle (UAV) and the control system is adapted for controlling the UAV, comprising piloting the UAV by the second person or the rescue subject through the control system.

8. The method of claim 6 wherein the rescue pod has deployable countermeasures comprising one or more of chaff, flares and blinking lights controlled through the control system, comprising deploying one or more countermeasures as needed.

9. The method of claim 1 wherein the rescue pod has a first floor in the compartment held by shear pins and a second floor below the first floor, the first and second floors separated by a crushable material, such that upon a hard landing the pins shear and deceleration is moderated by the first floor crushing the crushable material.

10. The method of claim 1 wherein the rescue pod has an inflatable balloon below a bottom surface, comprising inflating the balloon upon a hard landing, compression of the balloon moderating deceleration.

11. A system for extracting a rescue subject from a surface position, comprising:

a rescue pod having an enclosed compartment with a door, the rescue pod having a main parachute and a control system with wireless communication circuitry;

an aircraft having a cargo bay with a door; and apparatus in the cargo bay of the aircraft comprising a winch adapted to deploy and retrieve a tether attached to the rescue pod;

wherein the rescue pod is launched through the door of the aircraft, the tether is controllably released from the winch, and the aircraft is maneuvered into a circular orbit at a specific altitude, diameter and airspeed, creating a gravity well in which the tether describes a descending spiral configuration with the rescue pod descending along a vertical centerline of the circular orbit, the rescue pod is lowered to the surface position, the rescue subject is loaded into the enclosed compartment, and the rescue pod is lifted from the surface position by retrieving the tether with the winch or altering the path and speed of the aircraft, or both, to gradually increase tension in the tether lifting the rescue pod from the surface position.

12. The system of claim 11 wherein the rescue pod is retrieved back to and into the aircraft and the rescue subject is unloaded into the aircraft.

13. The system of claim 11 wherein the rescue pod is carried to a point over a predetermined second surface position, the gravity well is reestablished, the rescue pod is lowered to the second surface position, and the rescue subject is unloaded.

14. The system of claim 11 wherein the rescue pod is carried to a point over a predetermined second surface position, the rescue pod is released from the tether, the main parachute is deployed, the rescue pod is delivered down to a point proximate the second surface position, and the rescue subject is unloaded.

15. The system of claim 11 wherein the surface position is water and the rescue pod comprises inflatable flotation apparatus, wherein the rescue pod is delivered to the surface position, the flotation apparatus is inflated causing the rescue pod to float with the door facing upward, and the rescue subject is loaded from the water into the enclosed compartment through the door.

16. The system of claim 11 wherein the enclosed compartment is of a sufficient width to accommodate a second person in addition to the rescue subject, wherein the pod is lowered to the surface position with a medically trained rescue person in the compartment from the aircraft, the rescue subject is loaded, and rescue subject is treated by the medically trained person.

17. The system of claim 16 wherein the aircraft is an unmanned arial vehicle (UAV) and the control system is adapted for controlling the UAV, wherein the UAV is piloted by the second person or the rescue subject through the control system.

18. The system of claim 16 wherein the rescue pod has deployable countermeasures comprising one or more of chaff, flares and blinking lights controlled through the control system, wherein one or more countermeasures are deployed as needed.

19. The system of claim 11 wherein the rescue pod has a first floor in the compartment held by shear pins and a second floor below the first floor, the first and second floors separated by a crushable material, wherein upon a hard landing the pins shear and deceleration is moderated by the first floor crushing the crushable material.

20. The system of claim 11 wherein the rescue pod has an inflatable balloon below a bottom surface, wherein the balloon is inflated upon a hard landing, compression of the balloon moderating deceleration.

* * * * *